US011824360B2

(12) United States Patent
Shi et al.

(10) Patent No.: US 11,824,360 B2
(45) Date of Patent: Nov. 21, 2023

(54) APPARATUS AND METHOD FOR OPTIMIZING CARBON EMISSIONS IN A POWER GRID

(71) Applicant: SINGULARITY ENERGY, INC., Somerville, MA (US)

(72) Inventors: Wenbo Shi, Somerville, MA (US); Xin Chen, Somerville, MA (US); Na Li, Somerville, MA (US)

(73) Assignee: SINGULARITY ENERGY, INC., Somerville, MA (US)

( * ) Notice: Subject to any disclaimer, the term of this patent is extended or adjusted under 35 U.S.C. 154(b) by 0 days.

(21) Appl. No.: 18/102,408

(22) Filed: Jan. 27, 2023

(65) Prior Publication Data

US 2023/0223755 A1 Jul. 13, 2023

Related U.S. Application Data

(63) Continuation of application No. 18/082,455, filed on Dec. 15, 2022.

(60) Provisional application No. 63/368,663, filed on Jul. 17, 2022, provisional application No. 63/290,487, filed on Dec. 16, 2021.

(51) Int. Cl.
*H02J 3/06* (2006.01)
*G06Q 50/06* (2012.01)
*H02J 3/38* (2006.01)

(52) U.S. Cl.
CPC .............. *H02J 3/06* (2013.01); *G06Q 50/06* (2013.01); *H02J 3/381* (2013.01); *H02J 2203/10* (2020.01); *H02J 2203/20* (2020.01)

(58) Field of Classification Search
CPC .......... H02J 3/06; H02J 3/381; H02J 2203/10; H02J 2203/20; G06Q 50/06
See application file for complete search history.

(56) References Cited

U.S. PATENT DOCUMENTS

| 10,787,944 B2* | 9/2020 | Fritsch ...................... F01N 9/00 |
| 2010/0088136 A1* | 4/2010 | Cheng ................ G06Q 30/0202 705/28 |
| 2011/0113681 A1* | 5/2011 | Mostertz ................ C12M 21/02 47/1.4 |
| 2022/0247188 A1* | 8/2022 | Manikfan ........... H02J 7/00032 |
| 2023/0059038 A1* | 2/2023 | Sidhu ................. G06Q 30/0282 |

\* cited by examiner

*Primary Examiner* — Ziaul Karim
(74) *Attorney, Agent, or Firm* — CALDWELL INTELLECTUAL PROPERTY LAW

(57) ABSTRACT

Method and apparatus configured to receive a plurality of power flow data from at least a grid monitoring device connected to a grid network including a plurality of nodes, generate a power flow allocation for at least a node in the network as a function of the at least a power consumption datum and the at least a generation datum, determine a carbon flow as a function of the power flow allocation and a first set of stored relational rules, generate an objective function of a carbon flow and a second set of stored relational rules, minimize the objective function of a carbon flow as a function of the carbon optimization model and an optimization algorithm, generate a grid modification as a function of the minimization; and modify a grid parameter of the grid network as a function of the grid modification.

14 Claims, 10 Drawing Sheets

APPARATUS AND METHOD FOR OPTIMIZING CARBON EMISSIONS IN A POWER GRID

CROSS-REFERENCE TO RELATED APPLICATIONS

This application is a continuation of U.S. Nonprovisional application Ser. No. 18/082,455, filed on Dec. 15, 2022, and entitled "APPARATUS AND METHOD FOR OPTIMIZING CARBON EMISSIONS IN A POWER GRID," which is incorporated herein by reference in its entirety and which claims the benefit of priority of U.S. Provisional Patent Application Ser. No. 63/290,487, filed on Dec. 16, 2021, and titled "Real-Time Carbon Flow Tracing and Loss Allocation in Power Networks," and U.S. Provisional Patent Application Ser. No. 63/368,663, filed on Jul. 17, 2022, and titled "Grid Carbon Flow and Decarbonization Decision-Making," which are incorporated by reference herein in its entirety.

FIELD OF THE INVENTION

The present invention generally relates to the field of grid monitoring, modeling, and optimization. In particular, the present invention is directed to monitoring and optimizing grid emissions.

BACKGROUND

Carbon emitting power generator are a major contributor to the worsening effects of climate change. Therefore, Carbon tracing and carbon flow optimization of power grids that can trace emission to individual power generators are desirable.

SUMMARY OF THE DISCLOSURE

In an aspect an apparatus for optimizing carbon emissions in a power grid, the apparatus including a processor and a memory containing instructions configuring processor to receive a plurality of power flow data from at least a grid monitoring device communicatively connected to a grid network including a plurality of nodes, wherein the plurality of power flow data comprises at least a generation datum and at least a power consumption datum, generate a power flow allocation for at least a first node and a second node in the network as a function of the at least a power consumption datum and the at least a generation datum, determine, for at least a node of the plurality of nodes, a carbon flow as a function of the power flow allocation and a first set of stored relational rules, generate a carbon optimization model as a function of the carbon flow and a second set of stored relational rules, minimize the carbon emissions as a function of the carbon optimization model and an optimization algorithm, generate a grid modification as a function of the minimization; and modify a grid parameter of the grid network as a function of the grid modification.

In another aspect a method for optimizing carbon emissions in a power grid, the method comprising receiving, by at least a processor, a plurality of power flow data from at least a grid monitoring device communicatively connected to a grid network including a plurality of nodes, wherein the plurality of power flow data comprises at least a generation datum and at least a power consumption datum, generating, by the at least a processor, a power flow allocation for at least a first node and a second node in the network as a function of the at least a power consumption datum and the at least a generation datum, determining, by the at least a processor, a carbon flow as a function of the power flow allocation and a first set of stored relational rules for at least a node of the plurality of nodes, generating, by the at least a processor, a carbon optimization model as a function of the carbon flow and a second set of stored relational rules, minimizing, by the at least a processor, the carbon emissions as a function of the carbon optimization model and an optimization algorithm, generating, by the at least a processor, a grid modification as a function of the minimization; and modifying, by the at least a processor, a grid parameter of the grid network as a function of the grid modification.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Aspects of the present disclosure allow for optimized grid operations with minimum carbon emissions. Exemplary embodiments illustrating aspects of the present disclosure are described below in the context of several specific examples.

Figure 1:
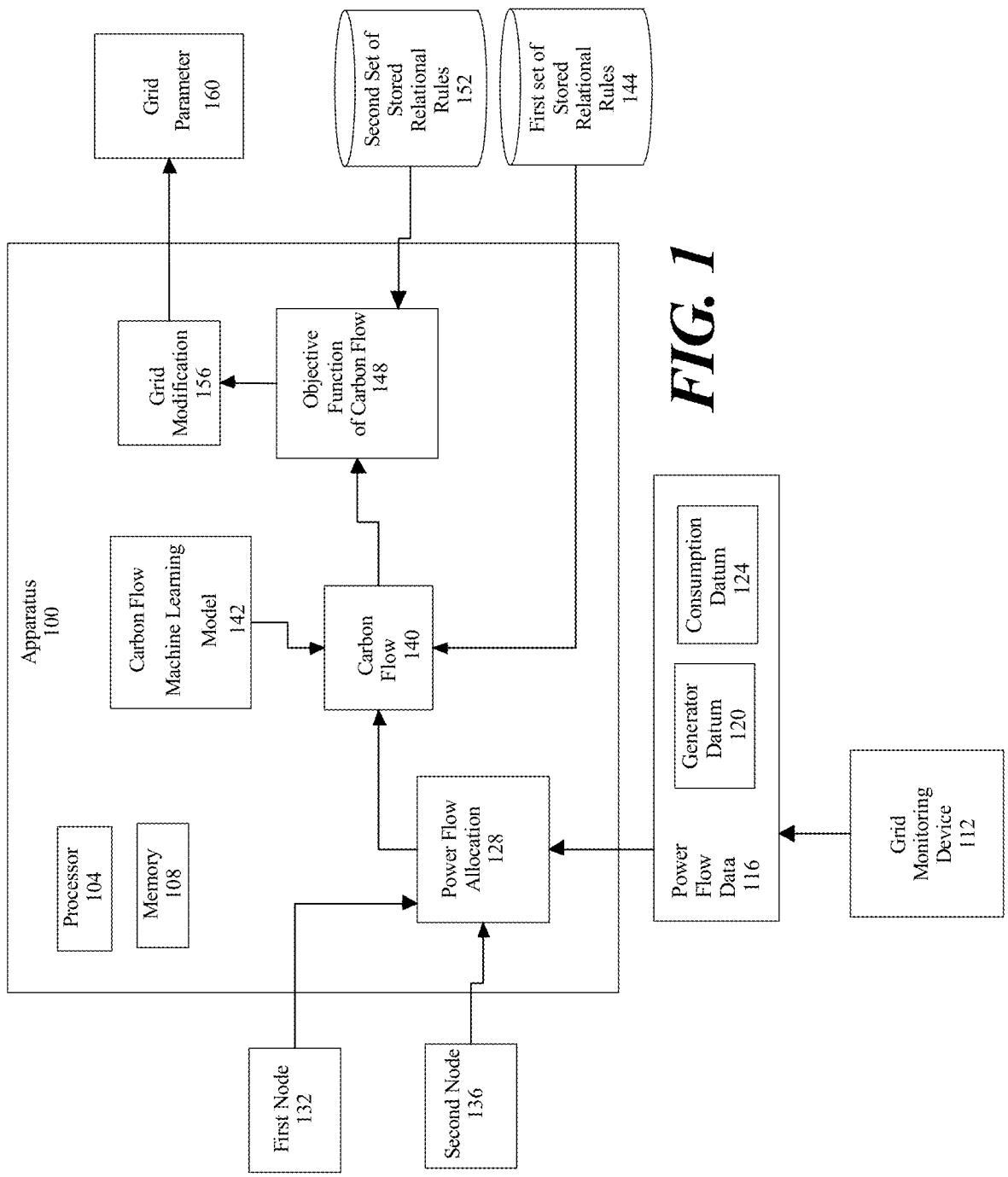
FIG. 1 is a block diagram illustrating an exemplary embodiment of an apparatus for optimizing carbon emissions in a power grid.

Referring now to FIG. 1, an exemplary embodiment of an apparatus 100 for optimizing carbon emissions in a power grid network is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or processor 104.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to refer to FIG. 1, apparatus 100 includes a memory 108 communicatively connected to the at least a processor 104, wherein the memory 108 contains instructions configuring processor 104 to perform tasks in accordance with this disclosure. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, memory 108 contains instructions configuring processor 104 to receive a plurality of power flow data from at least a grid monitoring device 112 communicatively connected a grid network including a plurality of nodes. A "plurality of power flow data," as used herein, is an amount of power in watts, kilowatts, or the like, being generated by a given power generator, and/or fuel type at a given moment and/or over a given period of time; power output quantities of a plurality of generators may include without limitation fuel mix data, defined for the purposes of this disclosure as data indicating a quantity of electrical power, and/or proportion of electrical power, being produced by a given type of power generator, where types may include without limitation nuclear power, oil power, natural gas power, coal power, hydroelectric power, solar power, wind power or any other category of power plant and/or power generation facility. In embodiments, power flow data may include forecasts of power consumption and power generation. Forecasts are described in more detail further below. In embodiments, power flow data may include power consumption data. In an embodiment, power flow data may include power losses in grid network. In some embodiments, power flow data may include transmission losses. In some embodiments, power flow data may include distributions losses. In embodiments, power flow data may include power at each node of grid network. In some embodiments, power flow data may include grid network topology data. Categories may include higher-level classification such as "renewables," power storage classifications such as "batteries,"

and/or a category for energy imported from another local power grid, for instance as described in further detail below. Persons skilled in the art, upon reviewing the entirety of this disclosure, will be aware of various types of power generator that may produce electrical power.

Continuing to refer to FIG. 1, a "grid monitoring device," as used herein, is a device operated by an entity that coordinates, monitors, and/or controls operation of an electrical power system and/or power grid, defined here as a "grid network" for which the entity has responsibility; a grid network may be incorporated in a national, and/or international power grid. In embodiments, at least a grid monitoring device may include a sensor configured to gather power flow data. In some embodiments, at least a grid monitoring device 112 may be located on at least a node. In an embodiment, at least a grid monitoring device 112 may be located on a transmission line. In some embodiments, at least a grid monitoring device 112 may be located at a substation. In embodiments, at least a grid network 112 may be located at a branch of grid network. It will become apparent to a person with ordinary skill in the art, upon reading this disclosure, the many locations in a grid network where at least a grid monitoring device 112 may be located. In embodiments, grid network comprises a local power grid. In embodiments, grid network comprises a plurality of power grids communicatively connected to each other. In some embodiments, grid network may include a simulated power grid, where the simulated power grid includes simulated power generators and simulated power consumers. Simulated power grid may include real data from grid monitoring devices. In embodiments, simulated power grid may include a combination of real data and simulated data. In an embodiment, a plurality of power flow data may be simulated data.

Continuing to refer to FIG. 1, in some embodiments, a grid monitoring device may include, without limitation, a device operated by an independent system operator (ISO) such as ISO New England, New York ISO, California ISO, or the like, a regional transmission organization (RTO) such as the Southwest Power Pool, and/or any other transmission system operator (TSO). A grid monitoring device may alternatively or additionally include a device operated by an institution, such as without limitation the U.S. Energy Information Administration (EIA), that reports power output quantities and/or related data with regard to one or more grid networks and/or grids incorporating one or more grid networks. Such institutions and/or devices operated thereby may report power output quantities and/or related data at any rate described herein, including without limitation on an hourly basis; in an embodiment, where one local grid monitoring device, such as an ISO and/or RTO reports data infrequently or irregularly, an institution such as EIA may report more frequently and/or in real time or near real time. For instance, EIA may report data in substantially real time, but with a one-day lag in reporting. Persons skilled in the art, upon reviewing the entirety of this disclosure, will be aware of various types of grid monitoring devices capable of producing at least a power datum as described in this disclosure.

Still referring to FIG. 1, at least a grid monitoring device 112 may be configured to report, using any suitable electronic communication protocol, a plurality of power output quantities of a plurality of power generators in a grid network corresponding to at least a grid monitoring device 112. "Power generators," as used in this disclosure, may include without limitation any kind of power plant or other device contributing to any power grid, including without limitation hydroelectric plants, coal power plants, oil power plants, natural gas power plants, photoelectric solar farms, solar collectors, wind farms, nuclear power plants, geothermal power plants, tidal power plants, or any other power plant and/or power production system that may occur to persons skilled in the art upon reviewing the entirety of this disclosure. For instance, and without limitation, first local grid monitoring device may monitor, and transmit, to devices including processor 104, power output quantities of power generators in a first local grid. As a further example, a second local grid monitoring device may monitor, and transmit to devices including processor 104, power output quantities of power generators in a second local grid. Local grids may exchange power; for instance, first local grid may contain one or more power generators providing power to second local grid, for instance and without limitation as described in further detail below.

Still referring to FIG. 1, plurality of power flow data 116 may be reported by a grid monitoring device 112 at a frequency of reporting, which may be regular or irregular. For example, and without limitation, one grid monitoring device 112 may report power flow data 116 every 1 minute, while another grid monitoring device 112 may report a power output quantity every 5 minutes. Additional grid monitoring devices 112 may report once an hour, once a day or the like. Grid monitoring devices 112 and/or other devices communicating with processor 104 may also transmit market data such as locational marginal prices (LMPs), load forecast or the like. Data provided by grid monitoring devices 112 may include any data described below. In some embodiments, at least a grid monitoring device 112 may report based on a request by processor 104, such as a data "pull" request.

Continuing to refer to FIG. 1, in some embodiments, processor 104 may receive one or more additional elements of data which may be used in any process including without limitation machine-learning processes, algorithms, or the like, and/or may be correlated with any other data and/or exogenous signals described in this disclosure as potentially included and/or correlated with other data in training entries and/or training data, including without limitation market data, weather data, holiday data, seasons, consumer meter data, or the like. One or more additional elements of data may be received from any device having access to such data, including one or more third-party sources such as weather services or the like. End-user data from consumers may be produced using meter data, such as without limitation as produced by a smart meter could use in any method as well. Processor 104 may fetch real-time and historical data including wholesale market data from local grid monitoring devices, retail market data from utilities, carbon intensity data from the local grid monitoring devices and/or a third party, and/or weather data from the National Weather Service and/or a third party. Processor 104 may connect with a user's main meter which may measure net power from local power grid in real time and the user's controllable energy resources such as energy storage, EV charging, diesel generation, fuel cells, flexible loads, and the like. User's historical metering data may be imported computing from the user's own metering system or a third party that collects metering data from utilities such as a utility API as described in further detail below. Processor 104 may be able to read real-time status, such as power, state-of-charge for energy storage, or the like of energy resources and also to control them via two-way communications such as ModBus, BACnet, and/or IEC 61850. There may be multiple users receiving data from processor 104 via graphical user interfaces and/or API. For example, a facility may monitor and control energy resources, a sustainability team may monitor and track emission impacts, an operations team may set operational preferences and monitor the system, and the like. Data produced as described herein may also be accessible to the public to view real-time energy and emission data, for instance to raise public awareness and engage sustainability initiatives. Utilities may interact with processor 104 to issue grid service requests such as demand response, for instance via OpenADR, and receive responses from processor 104.

With continued reference to FIG. 1, received power flow data 116 may be stored in a power quantities datastore. Power quantities datastore may be implemented, without limitation, as a relational database, a key-value retrieval datastore such as a NOSQL database, or any other format or structure for use as a datastore that a person skilled in the art would recognize as suitable upon review of the entirety of this disclosure. Power quantities datastore may include a plurality of data entries and/or records corresponding to user tests as described above. Data entries in a power quantities data store may be flagged with or linked to one or more additional elements of information, which may be reflected in data entry cells and/or in linked tables such as tables related by one or more indices in a relational database. Power quantities data store may be located in memory 108 and/or on another device in and/or in communication with apparatus 100. Power flow data 116 may be listed in records describing, without limitation, quantities in of power produced by a power generator and/or category of fuel as in fuel mix data as described above, in kilowatts, percentage and/or proportion of total power flowing through grid of each quantity produced by each power generator, a date and/or time or similar temporal attribute of recording of each power output quantity, an identifier of a power generator that produced the power quantity, whether the power generator was a base power generator or a marginal power generator, or the like. In some cases, as further noted above, operating data, such as without limitation power output quantities, may be reported at the generating-unit and/or power generator level, while in other cases operating data are reported at an aggregate level for all units at a plant with the same fuel type. Whether reported per power generator or as produced by different fuel types, power may be reported in any suitable unit including without limitation megawatts, kilowatts, or the like.

Continuing to refer to FIG. 1, database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in some embodiments, processor 104 may be configured to generate a forecast of power consumption data. In embodiments, processor 104 may be configured to generate a forecast of power generation data. In embodiments, processor 104 may be configured to forecast power consumption and/or power generation as a function of a machine learning model. In embodiments, processor 104 may utilize forecasts of power consumption and/or power generation to generate carbon flow. In some embodiments, processor 104 may utilize forecasts of power consumption and/or power generation to generate power flow.

Continuing to refer to FIG. 1, in an embodiment, processor 104 may be configured to calculate carbon flow from power flow data 116. In an embodiment, processor 104 may be configured to calculate carbon flow using a matrix transformation. In embodiments, processor 104 may be configured to calculate nodal carbon intensity from carbon flow using matrix transformation. In some embodiments, processor 104 may be configured to calculate nodal carbon intensity using matrix transformation. Matrix transformation is described in more detail further below.

With continued reference to FIG. 1, in an embodiment, processor 104 may be configured to forecast power flow data 116 as a function of a forecasting machine learning model. In some embodiments, processor 104 may be configured to forecast carbon flow as a function of a machine learning model. A "forecast," as used herein, is a prediction of future energy utilization. Forecasting power flow data 116 may include forecasting demand side power flow data 116 such as, without limitation, residential power use, commercial power use, charging of a battery connected to power grid, and the like. In some embodiments, forecasting power flow data 116 may include forecasting transmission loss, such as, without limitation, loss of energy between substations, loss of energy between transmission towers, and the like. In some embodiments, forecasting power flow data 116 may include forecasting production side power flow data 116 such as, without limitation, energy generated by a power plant, energy generated by a renewable energy source, such as solar panels, energy discharged by a battery connected to power grid, and the like. In an embodiment, forecasting machine learning model may be trained using forecasting training data. In some embodiments, forecasting training data may include previous outputs from forecasting machine learning model. In some embodiments, forecasting training data may include data from at least a sensor. In some embodiments, forecasting training data may include data from at least a grid monitoring device 112. Forecasting machine learning model may include any machine learning model and/or process described throughout this disclosure.

Still referring to FIG. 1, processor 104 may perform one or more processes, as described below, using techniques including machine learning, optimization, and the like to determine current carbon emission rates, also referred to in this disclosure as "carbon intensity," "nodal carbon intensity," "nodal emission rate," and/or "nodal emission factor." As used in this disclosure, a "current carbon emission rate" is a rate by mass of carbon released into the atmosphere by generators per unit of power passing through a node and/or per unit of power input to or output from a node; units of carbon intensity may include without limitation, kilograms per kWh or MWh, tons per kWh or MWh, or the like. In an embodiment, nodal carbon intensity may be calculated per consumer of power. This may enable apparatus 100 and/or consumer to match consumption and carbon intensity temporally; methods and systems disclosed herein may make it possible to align consumption and carbon intensity at the same time when calculating emissions. Processes described in this disclosure may improve locational and/or temporal granularity of the grid emission factors. Grid emission factors vary by location, season, and time-of-day. However, currently existent grid emission factor numbers are provided in annual average data, which can't capture local, node- and/or branch-specific, seasonality or time-of-day effect. Use of processes as described herein may permit provision of data with high temporal or spatial resolution, such as data provided in five-minute, 15-min, hourly, or monthly average temporal increments; temporal increments may be set to match with a desired granularity, such as a desired granularity of consumption data. In addition, calculation and/or projection of consumption-based carbon intensity as described herein may enable matching of consumption of energy and grid emission factors temporally and spatially for instance at substation, node, and/or city levels, which may be aggregated to regional levels for various regions of a grid: existing grid emission factors are generally outdated, and often two to four years old, and as annual values are not granular enough to meet that requirement. Methods described herein may ensure that grid emission factors match with consumption temporally. Embodiments described in this disclosure may match time and/or location resolution to meter reading resolution; for instance, embodiments may use a real-time grid emission factor for sites with real-time electricity data and monthly grid emission factor for sites with only monthly meter reads.

Continuing to refer to FIG. 1, carbon intensity may be calculated, transmitted, and/or received based on a measured, modeled, or calculated "carbon emission factor" for a given fuel type, generator type, generator, power plant or the like, defined for the purposes of this disclosure as an average emission rate (for instance expressed as carbon/megawatt hour) of power generators with that kind of fuel or the like in that location. A carbon emission factor may be calculated using the environmental protection agency (EPA) historical data, data measured using monitors and/or reporting at specific power plants, or other reporting service historical data and may be used in training data for calculation of current and/or projected carbon intensity and/or marginal carbon intensity as described in further detail below. An emission factor for a given fuel type may indicate average carbon intensity of power generators with that fuel type.

Still referring to FIG. 1, in some embodiments, further processes may calculate a projected carbon flow, defined for the purposes of this disclosure as one or more values for a current carbon flow at a future time or date, and/or a function usable for calculating a carbon emission rates at a series of times and/or over a future time window; projected carbon flow may be estimated directly or power flow may be estimated and used to project the carbon flow. Processes may calculate a rate of change in a current carbon flow and/or power flow and/or a projected rate of change in carbon emission rate.

Continuing to refer to FIG. 1, in an embodiment, processes may calculate a past carbon tonnage, defined for the purposes of this disclosure as an amount of carbon released into the atmosphere based on carbon flow through a node, branch, or other portion of a grid, or an entire grid over a period of time prior to a current moment at which a process is performed. Processes may calculate indirect emissions from generation of purchased energy from local grids by consumers. Processes may calculate a projected future carbon tonnage, defined for the purposes of this disclosure as a quantity of carbon that will be released into the atmosphere over some future time interval between a present date and/or time and a future date and/or time, between two future dates and/or times, or the like. Processes may calculate avoided past carbon tonnage based on a reduction in carbon consumption and/or marginal emission rate. In an embodiment, processes may calculate the projected future carbon tonnage as a function of the projected carbon flow. Processes may calculate projected avoided carbon tonnage, given a projected reduction in carbon consumption and/or marginal emission rate. In some embodiments, processes may calculate projected avoided carbon tonnage as a function of the projected carbon flow. "Avoided carbon tonnage" is defined for the purposes of this disclosure as a reduction in carbon tonnage emitted owing to a change in power production and/or consumption. In an embodiment, processes may be performed using a batch process that performs processes as described herein on a set of data collected over some past period of time, such as a day, an hour, a week, or the like. Alternatively or additionally, one or more processes as described in this disclosure may be performed in real time as power output quantities are received from local grid monitoring devices.

Continuing to refer to FIG. 1, training data used by processor 104 may correlate any input data as described in this disclosure to any output data as described in this disclosure. As a non-limiting illustrative example inputs to training data may include training data entries, each correlating past power output quantities with at least a reported carbon emission datum. As another non-limiting illustrative example inputs to training data may include training data entries, each correlating power flow data with at least a time of the day, such as times when solar panels are producing electricity and times that they are not. In other nonlimiting examples, training data may include correlations between carbon flow data and times of the day. In examples, without limitation, training data may include correlations between power flow data and weather conditions. In another nonlimiting example, training data may include correlations between carbon flow data and weather conditions. In an example, without limitations, training data may include correlations between a time of the year, such as Summer or Winter, and power flow data. In another example, without limitations, training data may include correlations between a time of the year, such as Summer or Winter, and carbon flow data. At least a reported carbon emission datum may include any data describing rates of carbon emission, nodal carbon intensity, generation emission intensity, carbon emission factors, or the like, as reported by a reporting service such as the environmental protection agency (EPA), a state, provincial, and/or local environmental agency, and/or any other organization industry group or the like who is reporting carbon emission data. Nodal carbon intensity and carbon emission datum are described in more detail further below. Such data may be reported per power generator and/or per fuel type, per output of power generator, per local grid, and/or per time interval, which data may be used by processor 104 to generate training entries. In an embodiment, data provided by a reporting service may be two to four years old, at a lower resolution (yearly, quarterly), or the like, and may be in formats that are not readily usable such as in file forms that must be read in and then associated with other data; association of data provided by a reporting service with power output quantities may be performed using machine-learning processes as described in this disclosure. Machine learning processes and training data are described in more detail further below.

With continued reference to FIG. 1, power flow data 116 comprises at least a generation datum 120. A "generation datum," as used herein, is the power output generated by at least a power generator in the grid network. In a nonlimiting example, power generator may be a power plant communicatively connected to the grid network. In some nonlimiting examples, power generator may be a set of solar panels. In nonlimiting examples, power generator may include a battery pack during its discharge cycle. A "discharge cycle," as used herein, is a period when the battery is configured to release excess electricity into the grid network.

Continuing to refer to FIG. 1, power flow data 116 comprises at least a power consumption datum 124. A "power consumption datum," as used herein, is the power output consumed by at least a power consumer in the grid network, such as a residential building. In a nonlimiting example, power consumer may include an EV charging dock configured to charge electrical vehicles. In nonlimiting examples, power consumer may include a battery pack during its charge cycle. A "charge cycle," as used herein, is a period when the battery is configured to consume electricity from the grid as to charge the battery.

Still referring to FIG. 1, power flow data 116 may include at least a sectional power flow datum. A "sectional power flow datum," as used herein, is the power flow for a specific section of grid network. In an embodiment, sectional power flow datum may include the power flowing between two nodes. In some embodiments, sectional power flow datum may include generation datum 120 and power consumption datum 124 for a specified section of grid network. In embodiments, sectional power flow datum may be power flow data 116 generated from only specified monitoring devices. In a nonlimiting example, sectional power flow datum may be power flow data 116 for only a section of a grid network that is connected to a specific power plant, such as when gathering data about power flow from a high pollutant power plant such as a coal fired power plant. In another nonlimiting example, sectional power flow datum may be limited only to sections of grid network that are connected to clean power plants, such as wind mills and solar panels, as to identify the effect of the clean power plants in the carbon flow for those sections of the grid network.

Continuing to refer to FIG. 1, memory 108 contains instructions configuring processor 104 to generate a power flow allocation 128 for at least a first node 132 and a second node 136 from a plurality of nodes in the grid network. A "power flow allocation," as used herein, is the flow of electricity from individual power generators through the grid network. By tracing the flow from specific generators through the grid network, processor 104 may calculate the carbon emissions associated with power line losses, and therefore the total emissions created by generating electricity that is never delivered to any load. In some embodiments, with this metric, a utility may prioritize eliminating high-emission losses via system planning and/or operational strategies such as Volt/Var control to optimize carbon associated with line losses. A "Volt/Var control," as used herein, is a process of managing voltage levels and reactive power to achieve efficient grid operation by reducing system losses, peak demand or/and energy consumption. The Volt/Var control allows one or more voltage control devices connected to the grid network, such as devices located at power substations or coupled to grid monitoring devices, to reduce electricity voltage to power consumers. In an embodiment, such voltage control devices may include transformers, such as without limitation load tap changer (LTC) transformers, voltage regulators such as without limitation LTC voltage regulators, inverters and/or capacitors configured to be used as control devices for voltage and reactive power (Volt/Var) control. In further embodiments, power substations may be configured to receive a command for reducing/increasing voltage from processor 104. In some embodiments, power flow allocation 128 may include power consumer voltage levels. In a nonlimiting example, processor 104 may be configured to transmit a command to a power generator, such as through an API, to reduce production of electricity based on the low voltage consumption of the power consumer. In another nonlimiting example, processor 104 may transmit a command to a power generator to increase production of electricity based on a predicted high consumption by power consumers, such as during peak consuming times. In some embodiments, a voltage control device may be coupled to at least a node in the grid network. In a nonlimiting example, processor 104 may generate a power flow allocation for a first 132 and second node 136 that takes into account reduced generation of power by at least a power generator based on the voltage limits of at least a power consumer connected between first node 132 and second node 136. In some embodiments, power flow allocation 128 may be generated as a function of a power flow machine learning model. In embodiments, power flow machine learning model may be trained using power flow training dataset. Machine learning model is discussed in more detail further below.

Still referring to FIG. 1, in an embodiment, processor 104 may use power flow data 116, as described above, as input to a flow tracing algorithm, such as, and without limitation, Bialek's flow tracing algorithm, which is described below. The first step includes constructing a distribution matrix $A_u$ such that:

$$[A_u]_{ij} = \begin{cases} 1 & \text{for } i = j \\ -C_{ji} = -|P_{j-i}|/P_j & \text{for } j \in \alpha_i^{(u)} \\ 0 & \text{otherwise} \end{cases}$$

In this example, $P_j$ is the total flow through node j, and $P_{j-i}$ is the flow into node j from node i. Continuing this example, the second step is to calculate the contribution from the kth generator to a node i as $[A_u^{-1}]_{ik} P_{G_k}$, where $P_G$ is the vector of power generated at each generator. Continuing this example, the result of this algorithm is the contribution of each power generator to the power flowing through each line in the network, and the contribution of each generator to each load consuming power from the network. The flow allocation algorithm is run on at least a power datum 116, and results may be stored in a database. The algorithm may run immediately when new data is received from a source, such as a grid monitoring device 112. Using a flow allocation algorithm, apparatus 104 may trace the flow from individual generators through the grid network, calculating the total power from each generator that is flowing through each node, line, and load. Then, using the carbon intensity calculation method described further below, apparatus 104 may convert the power flows into carbon flows. The result is the carbon emissions attributable to each individual node in the grid network. For example, without limitations, while an entire network may be powered by 40% Generator A and 60% Generator B, this average breakdown will not be accurate for every individual node. Depending on its position in the network topology, a node could be receiving 100% of its power from Generator B, or 80% from A and 20% from B, or any other combination.

Still referring to FIG. 1, in some embodiments, processor 104 may use training entries to train one or more machine-learning processes, including without limitation a forecast process such as an emission projection machine-learning process, an estimation process, such as used for determination of current rates of carbon emission and/or rates of change thereof, and/or marginal emission rates, and/or other machine-learning processes as described in further detail below. A "machine learning process," as used in this disclosure, is a process that automatedly uses a body of training data to generate an algorithm that will be performed by processor 104 and/or model to produce outputs given data provided as inputs; this is in contrast to a non-machine learning software program where the commands to be executed are determined in advance by a user and written in a programming language. In an embodiment training may be used to generate a model and/or algorithm that may be used to generate outputs without further training; in other words, once created during training, model and/or algorithm may be performed on inputs without further reference to training data. Determining current rates of carbon emission and/or rates of change and/or marginal emission rates, for a power grid, subset of a power grid, and/or node, may be performed, without limitation, as disclosed in system and methods as described in U.S. Nonprovisional application Ser. No. 16/879,303, filed on May 20, 2020, and entitled "METHODS AND SYSTEMS FOR MACHINE-LEARNING FOR PREDICTION OF GRID CARBON EMISSIONS," the entirety of which is incorporated herein by reference.

Continuing to refer to FIG. 1, memory 108 contains instructions configuring processor 104 to determine a carbon flow 140 for the at least a node in the grid network as a function of the power flow allocation 124 and a first set of stored relational rules 144. A "carbon flow," is the carbon emission in a grid network calculated for at least a portion of a grid network and/or for an entire grid network, and may include emissions for nodes, lines, loads, and/or power consumers. In an embodiment, carbon flow 140 may be calculated based on the power flow between two nodes. In embodiments, carbon flow 140 may be calculated for a plurality of nodes. In an example, processor 104 may calculate the carbon emissions of the electricity delivered to an individual load, rather than just the network as a whole. In an example, without limitations, with this information, utilities can develop demand-response and other demand-side management programs to reduce carbon emissions much more accurately than using system-wide average carbon emissions. In an embodiment, determining carbon flow 140 may include determining one or more values that can be treated, alone or in combination, as equivalent to carbon flow 140. In an embodiment, carbon flow 140 may include at least a nodal carbon intensity. In a nonlimiting example, carbon flow 140 may include the calculated carbon intensity of power generation related polluters, such as sulfur dioxide ($SO_2$), arsenic, nitrogen oxides ($NO_x$), and the like. In some embodiments, carbon flow 140 may be calculated as a function of a carbon flow 140 machine learning model 142. In embodiments, carbon flow 140 machine learning model may be trained using a carbon flow training dataset. In a nonlimiting example, carbon flow training dataset may include correlations of generator carbon emissions to carbon emissions of the electricity delivered to an individual load. Machine learning models are described in more detail further below.

Continuing to refer to FIG. 1, "first set of stored relational rules," as used herein, is a set of equations/parameters/constraints related used to generate a power flow allocation 128. In a nonlimiting example, first set of stored relational rules 144 may include power contributions by at least a generator to at least a node. In another nonlimiting example, first set of relational rules 144 may include the total electricity flow between at least two nodes. In embodiments, first set of stored relational rules 144 may include a machine learning model. In an embodiment, first set of stored relational rules 144 machine learning model may be trained using a training dataset. In embodiments, first set of stored relational rules 144 training dataset may include a plurality of tunable coefficients included in first set of relational rules 144. In embodiments, training first set of relational rules 144 machine learning model may include tunning a plurality of coefficients in training dataset. In a nonlimiting example, training first set of relational rules 144 machine learning model may include tunning at least a coefficient based on previous outputs from machine learning model, and/or previous determinations of power flow allocation 128. In some embodiments, power flow training dataset may include first set of stored relational rules 144. In a nonlimiting example, training dataset may include correlations of generator power contributions to power flow between a plurality of nodes. First set of stored relational rules 144 is described in more detail in FIG. 2. Machine learning models/processes are described in more detail at FIGS. 7-9

With continued reference to FIG. 1, in a nonlimiting example, nodal carbon intensity based on carbon flow 140 may be determined for any node in the system, using the target's individual generator breakdown and a model of the carbon emitted by each generator. This is in contrast to current carbon calculation solutions, which use grid-wide averages of power generators, and produce a single carbon value for the entire system, regardless of network topology. In some embodiments, processor 104 may determine nodal carbon intensity based on a carbon flow 140 using generator emissions. In embodiments, generator emissions may be expressed in pounds of carbon dioxide per megawatt-hour (lbs $CO_2$/MWh). In some embodiments, generation datum 120 may include generator emissions. This figure may be a generator's annual average emissions from the EPA eGRID dataset, or may be consumed live from a continuous emissions monitoring system at the generator itself.

Intensity may be calculated for a node given the following:
n inflow sources, such as generators or upstream nodes and/or branches, which may generally be denoted $G_1$, $G_2, \ldots, G_n$ with intensities $CI_1, CI_2, \ldots, CI_n$. The set of generators and associated intensities may change at each timestamp. Intensities $CI_1, CI_2, \ldots, CI_n$ may be computed recursively, traversing back to generators over intermediate nodes and/or branches to generators; calculations as shown here may be performed recursively and/or iteratively to determine accurate intensities and/or power input from upstream nodes, branches, and/or generators to a current node, and in turn downstream to subsequent nodes and/or branches.

The power input to the node from each generator: $P_{G_1}$, $P_{G_2}, \ldots, P_{G_n}$. Some or all of these values may be 0, and they may change at each timestamp.

Nodal carbon intensity relating to and/or based on a carbon flow 140 may then be:

$$\frac{\sum_{i=1}^{n} P_{G_i} * CI_i}{\sum_{i=1}^{n} P_{G_i}}$$

Nodal carbon intensity based on a carbon flow 140 may be calculated for every node in real time and stored in the database.

Still referring to FIG. 1, results of machine-learning processes and/or other processes as described below to calculate carbon flow and/or rate of change thereof may be stored in a carbon flow datastore. Carbon flow datastore may be implemented in any manner suitable for implementation of power quantities datastore as described above. Process may alternatively or additionally be provided to a client device operated by an end-user such as without limitation a manager who makes energy management decisions, a green technology company, a company attempting to achieve a carbon offset or other environmental mandate, and/or a policy maker. Results may be transmitted via a client interface, which may perform one or more optimization, recommendation and/or forecasting outputs in textual and/or graphical form. Results may alternatively or additionally be communicated using an API, for instance as described in further detail below. Client interface may provide a two-way communication interface with client devices, including without limitation by means of graphical user interfaces, industry communications protocols such as Modbus, BACnet, IEC 61850, TCP/IP, other proprietary protocols, and/or an API.

Still referring to FIG. 1, processor 104 may fetch grid and/or market data from one or more local grid monitoring devices, such as without limitation locational marginal prices (LMPs), historical emissions, and emission data from a reporting service such as the EPA. Estimation process and/or forecast and/or models may be built and/or trained using historical data. Real-time grid data from local grid monitoring devices' web services may be ingested into computer and sent to models and/or processes to estimate and predict grid carbon intensities. Results may be stored and then served, for instance using a REST web service according to the RESTful web service protocol generated using the representational state transfer (REST) architectural style, for other applications to access grid carbon intensity data. Models and/or machine-learning processes may be updated and/or validated by benchmarking with ground truth, defined for the purposes of this disclosure as ex-post emission data to ensure model accuracy and reliability; such data may be received, without limitation, from reporting services, which may, for instance, provide emission data some period of time, such as a year or more, after real time or batch processes have process outputs. Updates to machine-learning processes and/or models may be performed by adding further training data entries associating newly received reporting service data with corresponding power output quantities, which may be correlated using common temporal data.

Still referring to FIG. 1, processor 104 may receive one or more additional elements of data which may be used in any process including without limitation machine-learning processes, algorithms, or the like, and/or may be correlated with any other data and/or exogenous signals described in this disclosure as potentially included and/or correlated with other data in training entries and/or training data, including without limitation market data, weather data, holiday data, seasons, consumer meter data, or the like. One or more additional elements of data may be received from any device having access to such data, including one or more third-party sources such as weather services or the like. End-user data from consumers may be produced using meter data, such as without limitation as produced by a smart meter could use in any method as well. Processor 104 may fetch real-time and historical data including wholesale market data from local grid monitoring devices, retail market data from utilities, carbon intensity data from the local grid monitoring devices and/or a third party, and/or weather data from the National Weather Service and/or a third party. Processor 104 may connect with a user's main meter which may measure net power from local power grid in real time and the user's controllable energy resources such as energy storage, EV charging, diesel generation, fuel cells, flexible loads, and the like. User's historical metering data may be imported computing from the user's own metering system or a third party that collects metering data from utilities such as a utility API as described in further detail below. Processor 104 may be able to read real-time status, such as power, state-of-charge for energy storage, or the like of energy resources and also to control them via two-way communications such as ModBus, BACnet, and/or IEC 61850. There may be multiple users receiving data from computing device 104 via graphical user interfaces and/or API. For example, a facility may monitor and control energy resources, a sustainability team may monitor and track emission impacts, an operations team may set operational preferences and monitor the system, and the like. Data produced as described herein may also be accessible to the public to view real-time energy and emission data, for instance to raise public awareness and engage sustainability initiatives. Utilities may interact with computing device 104 to issue grid service requests such as demand response, for instance via OpenADR, and receive responses from processor 104.

Still referring to FIG. 1, memory 108 contains instructions configuring processor 104 to generate an objective function 148 of a carbon flow and a second set of stored relational rules 152. An "objective function of a carbon flow," as used herein, is an objective function used to optimize carbon emissions in a grid network based on at least a constraint. In an embodiment, a constraint may include the power generators carbon production connected to the grid network. In some embodiments, a constraint may include the limit of power output by a clean power plant, such as solar panels. In embodiments, a constraint may be the carbon flow between at least two nodes in a network. In a nonlimiting example, objective function 148 may be used to reduce the inputs. A "second set of stored relational rules," as used herein, is a set of equations/parameters/constraints used for determining carbon flow 140. In a nonlimiting example, second set of stored relational rules 152 may include active generation of power by a power generator at the at least a node. In another nonlimiting example, second set of relational rules 152 may include a power generator carbon intensity. In embodiments, second set of stored relational rules 152 may include a machine learning model. In an embodiment, second set of stored relational rules 152 machine learning model may be trained using a training dataset. In embodiments, second set of stored relational rules 152 training dataset may include a plurality of tunable coefficients included in second set of relational rules 152. In embodiments, training second set of relational rules 152 machine learning model may include tunning a plurality of coefficients in training dataset. In a nonlimiting example, training second set of relational rules 152 machine learning model may include tunning at least a coefficient based on previous outputs from machine learning model, and/or previous determinations of carbon flow 140. In some embodiments, In an embodiment, carbon intensity training dataset may include second set of stored relational rules 152. Second set of stored relational rules 152 is described in more detail in FIG. 2. Machine learning models/processes are described in more detail at FIGS. 7-9

Still referring to FIG. 1, in embodiments, objective function 148 may be a machine learning model. In some embodiments, memory 108 may contain instructions configuring processor 104 to train a carbon optimization machine learning model as a function of a carbon optimization training set. In some embodiments, carbon optimization training set may include first set of stored relational rules 144. In embodiments, carbon optimization training set may include second set of stored relational rules 152. In embodiments, carbon optimization training set may include previous outputs from objective function 148. In further embodiments, carbon optimization training set may include past outputs from carbon optimization machine learning model. In embodiments, the carbon optimization machine learning model is configured to receive the power flow data, the power flow allocation and the nodal carbon intensity as inputs and outputs the optimized grid modification. In some embodiments, memory 108 may contain instructions configuring processor 104 to determine a carbon flow as a function of the carbon optimization machine learning model. Objective function 148 and machine learning models are described in FIGS. 2-9.

With continued reference to FIG. 1, memory 108 contains instructions configuring processor 104 to minimize the objective function of carbon flow 140 as a function of an optimization algorithm. The optimization algorithm is described in more detail below. In a nonlimiting example, minimization may include assigning scores for each power generator based on the power flow of the nodes connected to the power generator, the power generator's power output into the grid network and the carbon intensity of the power generator. In embodiments, objective function of carbon flow may include minimizing a power consumer carbon footprint. Minimization and optimization methods are described in more detail below.

Still referring to FIG. 1, processor 104 may compute a score associated with each variable and select variables to minimize and/or maximize the score, depending on whether an optimal result is represented, respectively, by a minimal and/or maximal score; a mathematical function, described herein as an "objective function," may be used by processor 104 to score each possible pairing. Objective function may be based on one or more objectives as described below. In various embodiments a score of a particular variable, such as a power-flow related variable, may be based on a combination of one or more factors, including generator carbon intensity, power flow direction, power flow related variables, such as nodal voltage profiles, active generation power, carbon flow variables, such as carbon flow 140, and the like. Each factor may be assigned a score based on predetermined variables. In some embodiments, the assigned scores may be weighted or unweighted.

Optimization of objective function may include performing a greedy algorithm process. A "greedy algorithm" is defined as an algorithm that selects locally optimal choices, which may or may not generate a globally optimal solution. For instance, processor 104 may select power plant generation variables so that scores associated therewith are the best score for each power plant generation variable.

Still referring to FIG. 1, objective function may be formulated as a linear objective function, which processor 104 may solve using a linear program such as without limitation a mixed-integer program. A "linear program," as used in this disclosure, is a program that optimizes a linear objective function, given at least a constraint. For instance a power flow constraint. In various embodiments, apparatus 100 may determine a carbon flow constraint that maximizes a total score subject to a constraint that carbon flow-related variable are equal or less than zero. A mathematical solver may be implemented to solve for the set of power-flow variables and carbon-flow variables that maximizes scores; mathematical solver may implemented on processor 104 and/or another device in apparatus 100, and/or may be implemented on third-party solver.

With continued reference to FIG. 1, optimizing objective function may include minimizing a loss function, where a "loss function" is an expression an output of which an optimization algorithm minimizes to generate an optimal result. As a non-limiting example, processor 104 may assign variables relating to a set of parameters, which may correspond to score components as described above, calculate an output of mathematical expression using the variables, and select a variable that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs.

Continuing to refer to FIG. 1, in some embodiments, processor 104 is configured to generate an energy storage power model as a function of the at least a power datum. In further embodiments, processor 104 is configured to determine an energy storage carbon intensity as a function of the energy storage power model. In embodiments, processor 104 is further configured to generate an energy storage carbon emission model as a function of the energy storage carbon intensity. In some embodiments, energy storage carbon emission model may be a machine learning model. In embodiments, the energy storage carbon emission model may be trained by an energy storage training dataset. In some embodiments, energy storage training dataset may include a third set of stored relational rules. In some embodiments, energy storage carbon emission model may be generated as a function of the third set of relational rules and a binary variable, where the binary variable indicates whether energy storage is charging or discharging at a set time. A "third set of stored relational rules," as used herein, is a set of parameter/constraints/equations related to generating carbon emissions model, such as generator carbon intensity. In an embodiment, objective function 148 may be generated as a function of the energy storage carbon emission model. The energy storage power model, energy storage carbon intensity and optimized carbon model are described in more detail in FIG. 2. Machine learning models are described in more detail further below.

Figure 2:
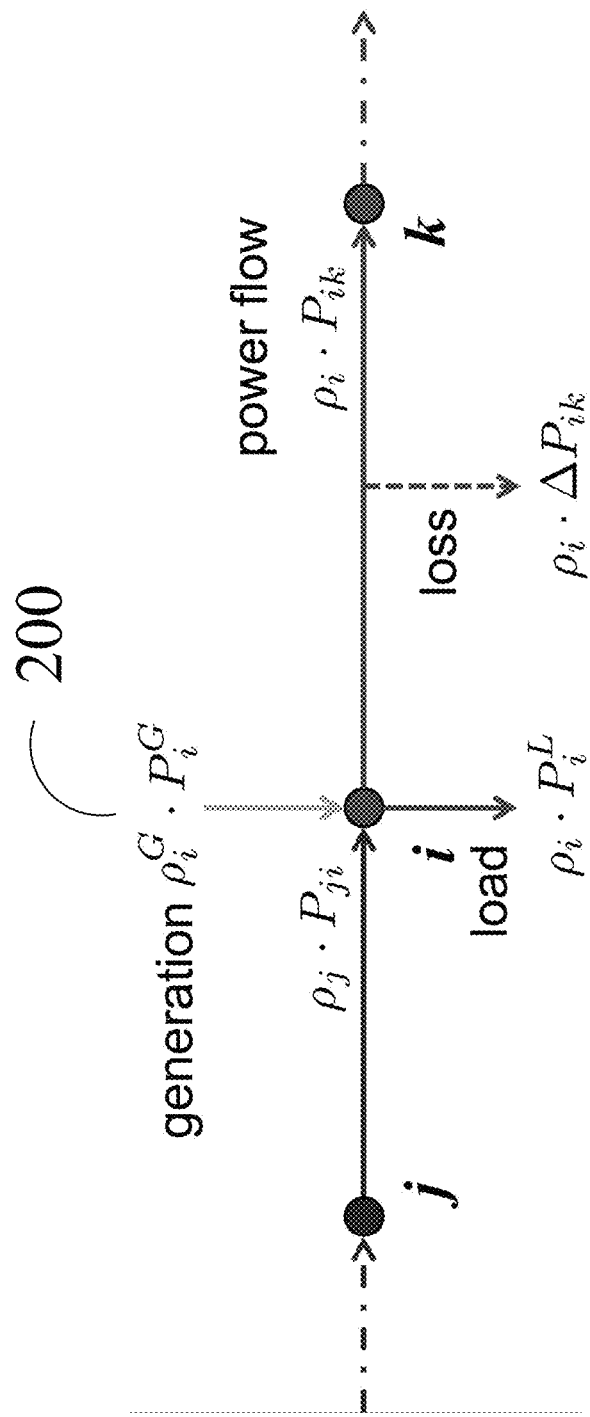
FIG. 2 is an illustrative example of a carbon emission flow associated with a power flow.

Referring now to FIG. 2, in an illustrative example, a carbon emission flow associated with a power flow is described as below.

Objective: $\min_{x \in X} C_{power}(x, y) + C_{carbon}(x, y, z)$ s.t. Power Flow Equations$(x, y) = 0$ Power Flow Constraints$(y) \leq 0$ Carbon Flow Equations$(x, y, z) = 0$ Carbon Flow Constraints$(z) \leq 0$.

In this example, which is a carbon flow integrated optimal power flow (OPF), x denotes the decision variables that are subject to the feasible set X. The specification of x and X depends on the practical applications. For example, x can be the generations of power plants in economic dispatch, or the reactive power of static Var compensators in Var-Volt optimization, described in some detail in FIG. 1, or the site and size decisions of new renewable generation units in expansion planning, etc. y denotes the power flow-related variables, such as the nodal voltage profiles and branch power flows. z denotes the carbon flow-related variables, including the nodal carbon intensities p and carbon flow rates R, etc. Consider a power network described by a connected graph G(N,E), where N denotes the set of buses and E denotes the set of branches. Consider a power network described by a connected graph G(N,E), where N denotes the set of buses and E denotes the set of branches. For each node i, its nodal carbon intensity based on and/or relating to a carbon flow 140 is $$\rho i = \frac{\sum k \in G_i \rho_{i,k}^G P_{i,k}^G + \sum j \in N_i^+ \rho_j P_{ji}}{\sum k \in G_i P_{i,k}^G + \sum j \in N_i^+ P_{ji}}, i \in N$$

Where $P_{i,k}^G$ denotes the active generation power of k-th generator at node i, $\rho_{i,k}^G$ is the associated generation carbon emission intensity, and $G_i$ denotes the set of generators at node i. $P_{ji}$ is the active power flow from node j to node i and is the value at the receiving node i. $P_{ji}+\Delta P_{ji}$ is the power flow value at the sending node j, where $\Delta P_{1i}$ is the power loss of branch ji∈ E. N+ is the set of neighbor nodes that send power to node i. In the equation above, two key assumptions or principles for constructing the carbon flow model. One is the proportional sharing principle that is generally applied in the power flow tracing studies, since all power out-flows (including loads) from node i have the same carbon intensity $\rho_i$, and thus the nodal carbon emission injections are allocated to them in proportion to their power flow values. The other assumption is that the branch carbon intensity $\rho_{ji}$ is the same for the power flow $P_{ji}$ over this branch ji∈ E, also for the power loss $\Delta P_{ji}$, and equals to the nodal carbon intensity of the sending bus, i.e., $\rho_{ji}=\rho_j$. In this way, the carbon emissions per unit time that are attributed to a load $P_i^L$ is calculated by $R_i^L=\rho_i \cdot P_i^L$, and the emission amount that is attributed to the power network loss may be given by $$R_{loss} = \sum_{ji \in \varepsilon} \rho j * \Delta P_{ji}$$

FIG. 2 illustrates the carbon flow values associated with generation, load, and branch flow. The carbon flow equation above may be reformulated in a matrix form as:

$\rho=(P_{in}-P_B)^{-1}PG\rho G$ where $\rho:=(\rho_i)i\in N\in \mathbb{R}^N$ and $\rho G:=(\rho_{i,k}^G)k\in G_i, i\in N\in \mathbb{R}^{N_G}$ are column vectors that collect the nodal carbon intensities and generation carbon intensities, respectively. PG∈ $\mathbb{R}^{N\times N_G}$ is the generation power matrix that is constructed by taking $P_{i,k}^G$ as the entry at i-th row and k-column (k is the corresponding index in vector $\rho G$) for all k∈ Gi and i∈ N, while the rest entries of PG are all zero. $P_{in}:=\text{diag}(\Sigma k\in G_i P_{i,k}^G+\Sigma j\in N_i^+ P_{ji})\in \mathbb{R}^{N\times N}$ is the diagonal matrix whose i-th diagonal entry is the total power injection to node i. PB∈ $\mathbb{R}^{N\times N}$ is the power inflow matrix with PB[i,j]=$P_{ji}$ and PB[j,i]=0 if node j sends power flow $P_{ji}$ to node i.

The equation $$\min_{x \in X} C_{power}(x, y) + C_{carbon}(x, y, z)$$

aims to minimize the total cost that consists of the power-related cost $C_{power}$ and the carbon emission-related cost $C_{carbon}$. Depending on the practical problems, $C_{power}$ can be the generation cost, network loss, or grid expansion investment cost, etc. $C_{carbon}$ denotes the penalty cost on carbon emissions, which can be either on the generation side or the consumption side, or both. An example of these cost functions is given by $$C_{power} := \sum_{i \in N} \sum_{k \in G_i} c_{i,k,2} P_{i,k}^{G^2} + c_{i,k,1} P_{i,k}^G + c_{i,k,0}$$

$$C_{carbon} := c_{CO_2} * \sum_{i \in N} \sum_{k \in G_i} \rho_{i,k}^G P_{i,k}^G$$

Where $C_{power}$ denotes the total quadratic generation cost with the coefficients $\{c_{i,k,2}, c_{i,k,1}, c_{i,k,0}\}$, and $C_{carbon}$ is the penalty on generation-side emissions with the cost coefficient $c_{CO_2}$.

Continuing to refer to FIG. 2, in this exemplary embodiment, "Power Flow Equations (x, y)=0" denotes the power flow equations and "Power Flow Constraints (y)≤0" describes the power flow constraints, such as the voltage limits and line thermal constraints. These are the same as in the conventional OPF models. For example, the classic DC power flow model is widely used in OPF problems where the power flow equations and the power flow constraints are shown below.

$$P_i^L = \sum_{j \in N_i} P_{ji} + \sum_{k \in G_i} P_{i,k}^G i \in N$$

$$P_{ji} = B_{ji}(\theta_j - \theta_i) ji \in \varepsilon$$

$$-\overline{P}_{ji} \leq P_{ji} \leq \overline{P}_{ji}$$

Here, Ni denotes the set of neighbor nodes of node i. Bji is the susceptance of power line ji, θi is the phase angle of bus i, and Pji is the line transmission capacity. In an embodiment, each power flow constraint may be used in the optimization process as described in FIG. 1.

Still referring to FIG. 2, the carbon flow equation, Carbon Flow Equations (x, y, z)=0, may be formulated as $$\rho_i \left( \sum_{k \in G_i} P_{i,k}^G + \sum_{j \in N_i^+} P_{ji} \right) = \sum_{k \in G_i} \rho_{i,k}^G P_{i,k}^G + \sum_{j \in N_i^+} \rho_j P_{ji}$$

for all i∈ N. The carbon flow constraints, Carbon Flow Constraints (z)≤0, can take various forms according to practical requirements. For instance, an upper limit is imposed on the nodal carbon intensities as $\rho_i \leq \overline{\rho}_i$, in an upper limit is imposed on the consumption-side carbon emissions of each load as $\rho_i \cdot p_i^L \leq \overline{R}_i^L$, defines a fairness index on nodal carbon intensities and set a cap on it. When the nodal loads $p_i^L$ are given parameters, $\rho_i \cdot p_i^L \leq \overline{R}_i^L$ is equivalent to $\rho_i \leq \overline{\rho}_i$ by setting $\overline{\rho}_i = \overline{R}_i/p_i^L$. $\rho_i \in [0, \rho_{max}^G]$ due to the mix property of carbon flow, where $\rho_{max}^G := \max_{i,k}\{\rho_{i,k}^G\}$ is the largest generation emission intensity. If the upper limit $\overline{\rho}_i$ is larger than $\rho_{max}^G$ for certain node i imposes no constraint on $\rho_i$. The Carbon flow model, illustrated above, is a generalization of conventional OPF methods, which reduces to an OPF model if removing the carbon cost function, carbon flow equations and constraints. It indicates that all existing OPF techniques, such as linearization, convexification, decomposition, stochastic modeling, etc., can be applied to the power flow components in the carbon flow model. The Carbon flow model is also applicable to the multi-period optimization case with time-coupling constraints.

Continuing to refer to FIG. 2, in this exemplary embodiment, there are two key technical issues regarding the carbon flow equation when applying it to an optimization problem: the power flow direction and Bilinear terms.

As indicated by the set $N^+$, the carbon flow equation requires pre-determining the directions of all line power flows, to identify which are the in-flows for each bus. However, power flow directions are usually unknown before solving the carbon flow model problem.

Generally, generations $P_{i,k}^G$ and power flows $P_{ji}$ are variables in the optimization problem, and the nodal carbon intensities 140 ($\rho i$)$i \in N$ are also variables. Therefore, there are bilinear terms in the carbon flow equation, such as $\rho_j P_{ji}$, making the carbon flow model nonlinear and nonconvex.

Still referring to FIG. 2, in an exemplary embodiment, the following potential solutions may address the issue. To address the power flow direction issue, instead of a single power flow variable, processor 104 creates two non-negative power flow variables $P_{ij} \geq 0$ and $P_{ji} \geq 0$ for each line $ij \in \varepsilon$. $P_{ij}$ and $P_{ji}$ are defined as the power flows from node i to node j and from node j to node i, respectively. Then processor 104 may modify the carbon flow equation to recite:

$$\rho_i \left( \sum_{k \in G_i} P_{i,k}^G + \sum_{j \in N_i} P_{ji} \right) = \sum_{k \in G_i} \rho_{i,k}^G P_{i,k}^G + \sum_{j \in N_i} \rho_j P_{ji},$$

$$0 \leq P_{ij}, \; 0 \leq P_{ji}, \; P_{ij} * P_{ji} = 0.$$

In the equation above, processor 104 may replace $N_i^+$ the set of neighbor nodes that send power to node i) by $N_i$ (the set of all neighbor nodes of node i. Moreover, the complementarity constraint $0 \leq P_{ij}$, $0 \leq P_{ji}$, $P_{ij} \cdot P_{ji} = 0$ is added to ensure either $P_{ij}$ or $P_{ji}$ must be zero. In this way, processor 104 may circumvent the need to pre-determine the directions of power flows without corrupting the carbon flow model. Each branch power flow variable in the power flow equations and constraints, e.g., $P_{ji}$ in the DC power flow model, is substituted by $P_{ji} - P_{ij}$.

Alternatively, processor 104 may introduce a binary variable $\gamma_{ji} \in \{0,1\}$ for each line ji and replace the carbon flow equation by $$\rho_i(\Sigma_{k \in G_i} P_{i,k}^G + \Sigma_{j \in N_i} P_{ji}) = \Sigma_{k \in G_i} \rho_{i,k}^G P_{i,k}^G + \Sigma_{j \in N_i} \rho_j P_{ji};$$
$$\gamma_{ji} \in \{0,1\}, \; ji \in \varepsilon,$$

$$0 \leq P_{ij} \leq \gamma_{ji} M, \; 0 \leq P_{ji} \leq (1-\gamma_{ji})M$$

where M is a sufficiently large positive number, e.g., $M \geq \overline{P}_{ji}$. In this way, the use of binary variables circumvents the complementarity constraint $0 \leq P_{ij}$, $0 \leq P_{ji}$, $P_{ij} * P_{ji} = 0$. In an embodiment, both the equations above may be equivalent reformulations of the original carbon flow equation, and the equations may not require information about power flow direction. However, the equations above are nonconvex due to the complementarity constraint and binary variables. In some embodiments, each complementarity constraint may be used in the optimization process described in FIG. 1. The bilinear terms in the carbon flow equation, result from the quotient $$\rho i = \frac{\sum k \in G_i \rho_{i,k}^G P_{i,k}^G + \sum j \in N_i^+ \rho_j P_{ji}}{\sum k \in G_i P_{i,k}^G + \sum j \in N_i^+ P_{ji}}, \; i \in N.$$

The nodal carbon intensity based on and/or relating to a carbon flow 140 $\rho$ can actually be uniquely determined by $$\rho = (P_{in} - PB)^{-1} PG \rho G$$

given the power flow and generation profile. In particular, when the carbon flow constraints take the form of $\rho_i \leq \overline{\rho}_i$, one can eliminate the nodal carbon intensity variable $\rho$ and equivalently rewrite carbon flow equation as $(P_{in} - PB)^{-1} PG \rho G \leq \overline{\rho}$, where $\overline{\rho} := (\overline{\rho} i) i \in N$. Constraint $(P_{in} - PB)^{-1} PG \rho G \leq \overline{\rho}$, is generally nonconvex due to the matrix inverse, which motivates us to consider the transformation that multiples Pin–PB to the both sides of $(Pin-PB)^{-1} PG \rho G \leq \overline{\rho}$, resulting in a new constraint $PG \rho G \leq (P_{in} - PB)\overline{\rho}$. Since the generation carbon intensities $\rho G$ and the upper bound $\overline{\rho}$ are given parameters, $PG \rho G \leq (P_{in} - PB)\overline{\rho}$ is actually a set of linear constraints, which is desirable for optimization. However, constraint $PG \rho G \leq (P_{in} - PB)\overline{\rho}$ may not be equivalent to constraint $(P_{in} - PB)^{-1} PG \rho G \leq \overline{\rho}$. In the following proposition on the relation between the two equations, the key to the proof is the fact that all entries of the matrix $(P_{in} Pin - PB)^{-1}$ are non-negative.

Continuing to refer to FIG. 2, in an exemplary proposition, in terms of the feasible set F1 and the feasible set F2, described below, $F2 \subseteq F1$.

$$F1 := \{(PG, P_{in}, PB) | \text{Constraint}(P_{in} - PB)^{-1} PG \rho G \leq \overline{\rho}.$$

$$F2 := \{(PG, P_{in}, PB) | \text{Constraint } PG \rho G \leq (P_{in} - PB)\overline{\rho}.$$

Proposition 1 states that the second constraint is actually an inner approximation to the first constraint. Therefore, to substitute the original constraint with the linear constraint in the carbon flow model, the resultant optimal solutions must be feasible for the carbon flow model problem with the first constraint. By using both the reformulation and the inner approximation, the carbon flow equations and constraints become mixed integer linear constraints. If convex (linear) power flow equations and constraints are used, e.g., the DC flow model, the carbon flow model becomes a mixed integer convex (linear) programming problem, which can be solved efficiently via many available optimizers. In embodiments, and without limitation, each constraint above may be used by optimization process described in FIG. 1.

Still referring to FIG. 2, an exemplary embodiment of a carbon emissions model for energy storage is illustrated. Energy storage (ES) plays an important role in low-carbon grid operation, as it can charge when the grid is "clean" and discharge when the grid is "dirty". To facilitate the decarbonization operation of ES units, a virtual carbon emission model for ES and integrate it to the carbon flow model is proposed. Suppose that an ES unit is attached to node $i \in N$, the ES power model is given by $$0 \leq P_{i,t}^{ch} \leq (1 - \alpha_{i,t}) \overline{P}_i^{ch}, \; 0 \leq P_{i,t}^{dc} \leq \alpha_{i,t} P_{i,t}^{dc}$$

$$E_{i,t+1} = \kappa_i E_{i,t} + \Delta t (\eta_{chi} P_{chi,t} - 1 \eta_{dci} P_{dci,t}),$$

$$0 \leq E_{i,t} \leq \overline{E}_i, \alpha_{i,t} \in \{0,1\},$$

where $P_{i,t}^{ch}$ and $P_{i,t}^{dc}$ are the charging power and discharging power at time t, respectively. The binary variable $\alpha_{i,t}$ is used to enforce that an ES unit cannot charge and discharge at the same time. $E_{i,t}$ is the energy level or state of charge (SOC) level at time t with the upper limit $\overline{E}i$. $\eta_i^{ch} \in (0,1]$ and $\eta_i^{dc} \in (0,1]$ denote the charging and discharging efficiency coefficients, respectively. $k_i \in (0,1]$ denotes the storage efficiency factor that models the energy loss over time.

Based on the ES power model, an exemplary embodiment of the carbon emission model for ES recites:

$$F_{i,t+1} = \kappa_i F_{i,t} + \Delta t(\rho_{i,t}\eta_{chi}P_{chi,t} - \rho_{esi,t}\eta_{dci}P_{dci,t}),$$

$$\rho_{i,t}^{es} = F_{i,t}/E_{i,t}.$$

When ES units are connected to the grid, the carbon flow equation in carbon flow model at time t is modified as $$\rho_{i,t} = \frac{\rho_{i,t}^{es}P_{i,t}^{dc} + \sum k \in giP_{i,k,t}^{G}P_{i,k,t}^{G} + \sum j \in N_i^+ \rho j, tPji, t}{P_{i,t}^{dc} + \sum k \in giP_{i,k,t}^{G} + \sum j \in N_i^+ Pji, t}$$

or each node $i \in N$. The equation above indicates that an ES unit affects the carbon flow or the nodal carbon intensity only when it discharges, and it behaves like a load when charging. When discharging, the ES carbon intensity follows $$\rho_{i,t+1}^{es} = \frac{Fi, t+1}{Ei, t+1} = \frac{ki\rho_{i,t}^{es}Ei, t - \Delta t * \frac{\rho_{i,t}^{es}}{n_i^{dc}} * P_{i,t}^{dc}}{kiE_{i,t} - \Delta t * \frac{1}{n_i^{dc}} * P_{i,t}^{cd}} = \rho_{i,t}^{es}$$

which shows that the ES carbon intensity $\rho_{i,t}^{es}$ remains the same during discharging. When charging, the ES carbon intensity follows $$\rho_{i,t+1}^{es} = \frac{Fi, t+1}{Ei, t+1} = \frac{ki\rho_{i,t}^{es}Ei, t + \rho_{i,t} * \Delta tn_i^{ch}P_{i,t}^{ch}}{kiE_{i,t-1} + \Delta tn_i^{ch}P_{i,t}^{ch}} = \lambda_{i,t} * \rho_{i,t}^{es} + (1 - \lambda_{i,t}) * \rho_{i,t}$$

which can be viewed as a linear combination of the ES carbon intensity and the nodal carbon intensity $\rho_{i,t}$ with the energy weight $$\lambda_{i,t} := \frac{kiE_{i,t}}{kiE_{i,t} + \Delta tn_i^{ch}P_{i,t}^{ch}}$$

The carbon emission leakage associated with energy storage operation loss during [t−1, t] is $$L_{i,t} = (1 - \kappa_i)C_{i,t-1} + \Delta t \cdot \rho_{i,t}(1 - n_i^{ch})P_{i,t}^{ch} + \Delta t \cdot \rho_{i,t-1}^{es}\left(\frac{1}{n_i^{dc}} - 1\right)P_{i,t}^{dc}.$$

Referring back to FIG. 1, in an embodiment, memory 108 may contain instructions configuring processor 104 to transmit the optimized carbon allocation for the at least a first node and second node in the grid network.

Continuing to refer to FIG. 1. Memory 108 contains instructions configuring processor 104 to generate a grid modification 156 as a function of the minimization. A "grid modification," as used herein, is modification of power outputs from a plurality of power generators communicatively connected to the grid network based on an optimal power output that minimizes the carbon footprint of the grid network. In an embodiment, grid modification 156 may include modifications of power consumption by power consumers connected to grid network based on the optimal consumption that minimizes the carbon footprint of the grid network. In a nonlimiting example, processor 104 may be configured to generate a grid modification 156 for a set of power generators based on the minimization of the objective function of a carbon flow 140 as a function of the objective function 148. In another nonlimiting example, grid modification 156 may include optimal times of power consumption, such as during the day when solar panels are producing power. The grid modification is described in more detail in FIG. 2 and throughout this disclosure.

Continuing to refer to FIG. 1, memory 104 contains instructions configuring processor 104 to modify a grid parameter 160 of the grid network as a function of the grid modification. A "grid parameter," as used herein, is a parameter related to power generator outputs from a plurality of power generators. In an embodiment, modifying grid parameter 160 may include identifying and selecting power generators with low carbon intensity. In some embodiments, modifying grid parameter 160 may include using Volt/Var control to identify excess voltage and reduce power losses in the grid. In an embodiment, modified grid parameter 160 may include using the energy storage carbon emission model. In a nonlimiting example, grid parameter may be modified based on the available excess electricity available from energy storages, such as during peak consumption times. In some embodiments, processor 104 may be configured to reduce power losses as a function of a Volt/Var control, described in more detail further above. Alternatively or additionally, grid parameter may be modified according to one or more changes at power stations and/or on power lines, including without limitation Volt/Var control, improvements to impedance matching, reductions in line losses, rerouting lines to reduce overall path lengths, or the like. Alternatively or additionally, grid parameter may be modified using one or more consumption-side modifications, such as improvements to energy efficiency of homes, offices, factories, or the like, replacement of inefficient appliances or machinery with more efficient counterparts, use or installation and/or regulation of smart controls at the consumer side such as electric vehicle charging, and/or installation and/or regulation of controllable loads such as without limitation smart thermostats, smart appliances, or the like.

With continued reference to FIG. 1, in an embodiment, processor 108 may be configured to determine an energy cost as a function of the carbon optimization model. In an embodiment, determining energy cost includes minimizing power related costs. In embodiments, determining energy cost includes minimizing carbon related costs. In embodiments, determining energy cost includes minimizing power costs and carbon costs. In a nonlimiting example, determining energy costs may include taking an optimized carbon allocation and costs associated with each type of power generation in the grid network and determine the costs associated with reducing carbon allocation, such as balancing whether to switch power production from a high carbon intensity/low production cost power generator to a low carbon intensity/high production cost power generator. Carbon and power costs are described in more detail in FIG. 2.

Continuing to refer to FIG. 1, in an embodiment, processor 108 may be configured to reduce power output from at least a power generator as a function of the modified grid parameter. In an embodiment, reducing power output may include transmitting modified power parameter to a grid operator entity. A "grid operator entity," as used herein, is an entity responsible for distribution and/or production of electricity in the grid network, such as Eversource Energy, primarily located in Hartford, Conn. USA. In some embodiments, reducing power output may include transmitting modified grid parameter to an API connected to at least a power generator. In a nonlimiting example, processor 104 may transmit modified power production that increases the use of low carbon intensity generators, which may cause power generators connected to the API to increase output from renewables and reduce production from coal fired power plants. In some embodiments, modified power parameter may account for peak times for consumption and production.

Figure 3:
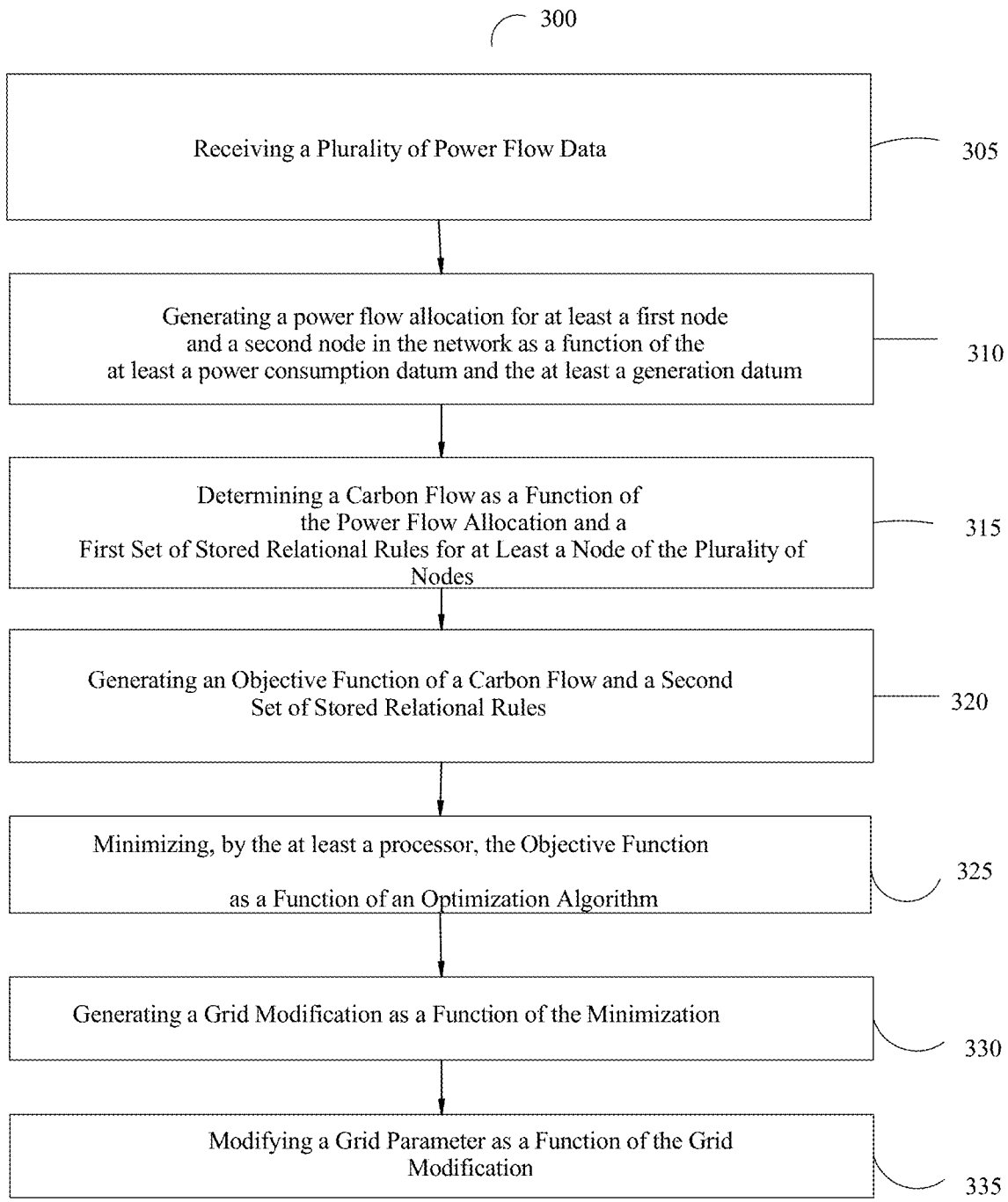
FIG. 3 is an illustrative example of a flow diagram of a method for optimizing carbon emissions in a power grid.

Now referring to FIG. 3, an exemplary embodiment of a method 300 for optimizing carbon emissions in a power grid is illustrated. At step 305 method 300 includes receiving, by at least a processor, a plurality of power flow data from at least a grid monitoring device communicatively connected to a grid network including a plurality of nodes, wherein the plurality of power flow data comprises at least a generation datum and at least a power consumption datum. In a nonlimiting example, power flow data may include power outputs for each power generator in the grid network.

Continuing to refer to FIG. 3, at step 310 method 300 includes generating, a power flow allocation for at least a first node and a second node in the network as a function of the at least a power consumption datum and the at least a generation datum. In a nonlimiting example, power flow is determined between two nodes based on the power generator outputs and power consumption between the two nodes. In some embodiments, method 300 further comprises determining the power flow allocation as a function of a power flow machine learning model.

Still referring to FIG. 3, at step 315 method 300 includes determining, by the at least a processor, a carbon flow as a function of the power flow allocation and a first set of stored relational rules for at least a node of the plurality of nodes. In some embodiments, method 300 may include determining the nodal carbon intensity as a function of a carbon intensity machine learning model. Machine learning models are described in more detail in FIGS. 7-9

With continued reference to FIG. 3, at step 320 method 300 includes generating, by the at least a processor, a carbon optimization model as a function of the carbon flow and a second set of stored relational rules.

Continuing to refer to FIG. 3, at step 325 method 300 includes minimizing, by the at least a processor, the objective function as a function of the carbon optimization model and an optimization algorithm. Minimizing the objective function and optimization algorithms are described in detail in FIGS. 1-2.

Still referring to FIG. 3, at step 330 method 300 includes generating, by the at least a processor, a grid modification as a function of the minimization. Grid modification and minimization are described in more detail in FIGS. 1-2. In some embodiments, method 300 may include generating a graphical representation of a carbon flow. In embodiments, method 300 may further include transmitting the graphical representation of a carbon flow to a computing device. In an embodiment, method 300 may include displaying the graphical representation of carbon flow on a graphical user interface (GUI).

Continuing to refer to FIG. 1, at step 335, method 300 includes modifying, by the at least a processor, a grid parameter of the grid network as a function of the grid modification. In some embodiments, method 300 may include generating an energy storage power model as a function of the power flow data. In an embodiment, method 300 may include determining an energy storage carbon intensity as a function of the energy storage power model. In embodiments, method 300 may include generating an energy storage carbon emission model as a function of the energy storage carbon intensity. In some embodiments, method 300 may include determining the optimized grid modification as a function of the energy storage carbon emission model. Machine learning models are described in more detail in FIGS. 7-9.

With continued reference to FIG. 1, in an embodiment, method 300 may include determining an energy cost as a function of the carbon optimization model. In some embodiments, method 300 may include reducing power output from at least a power generator as a function of the modified grid parameter. In further embodiments, modifying grid parameter may include using a Volt/Var control. Volt/Var control is described in more detail in FIG. 1.

Figure 4:
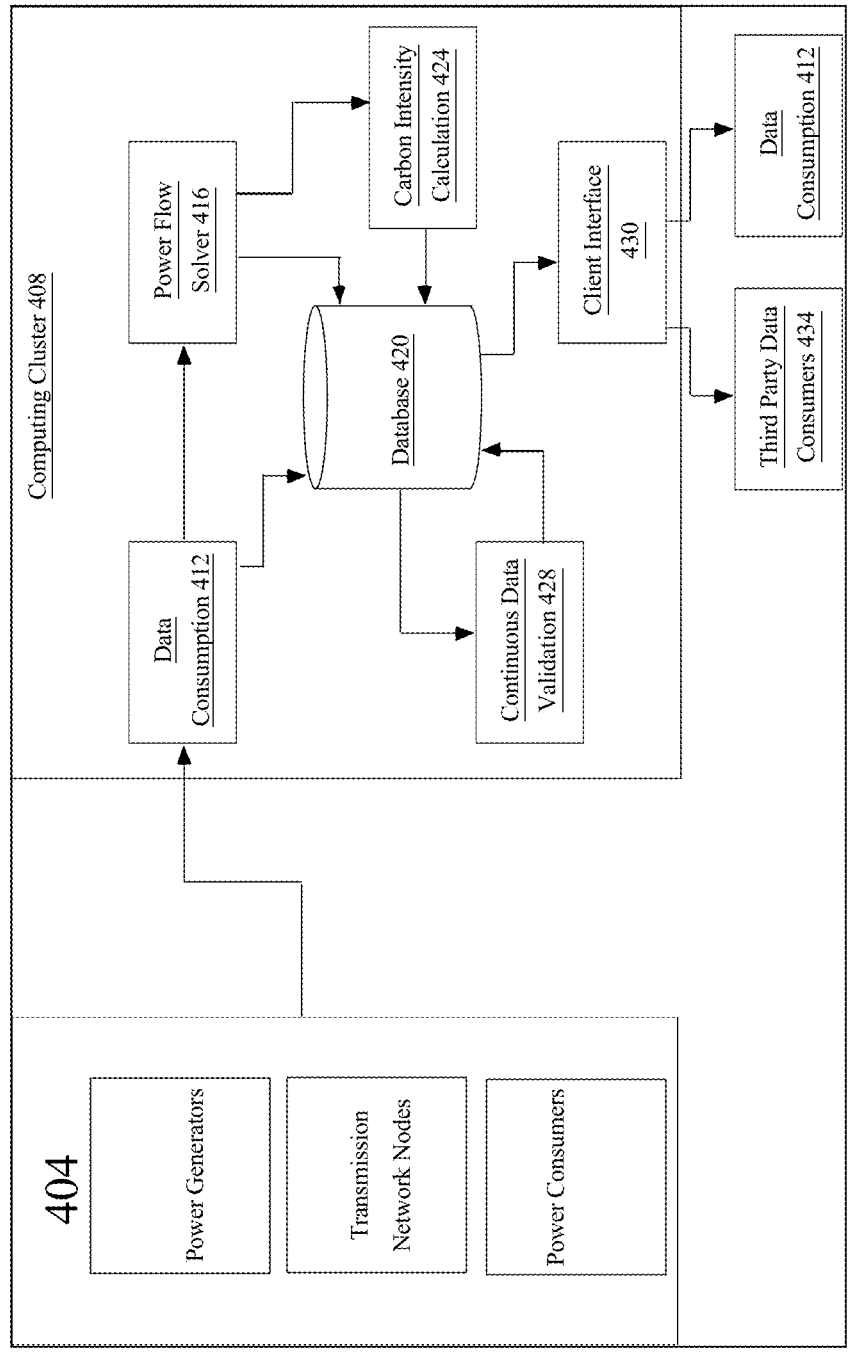
FIG. 4 is a block diagram illustrating an exemplary embodiment of the power grid network.

Referring now to FIG. 4, an exemplary embodiment of the power grid network 400. In this nonlimiting example, grid operators 404 include power generators, transmission nodes and power consumers. Data from grid operators 404 is sent to computer cluster 408 that includes a data consumption module 412, a power flow solver 416 configured to generate the power flow allocation, a database 420 configured to store grid data, a carbon intensity calculation module 424, a continuous data validation 428 configured to validate grid data at set intervals or/and when new grid data is available, a client interface 430, described in more detail in FIGS. 1 and 10, configured to display and/or transmit data, a third party consumer 434, described in detail in FIG. 1 and a live dashboard 438 configured to display the data.

Figure 5:
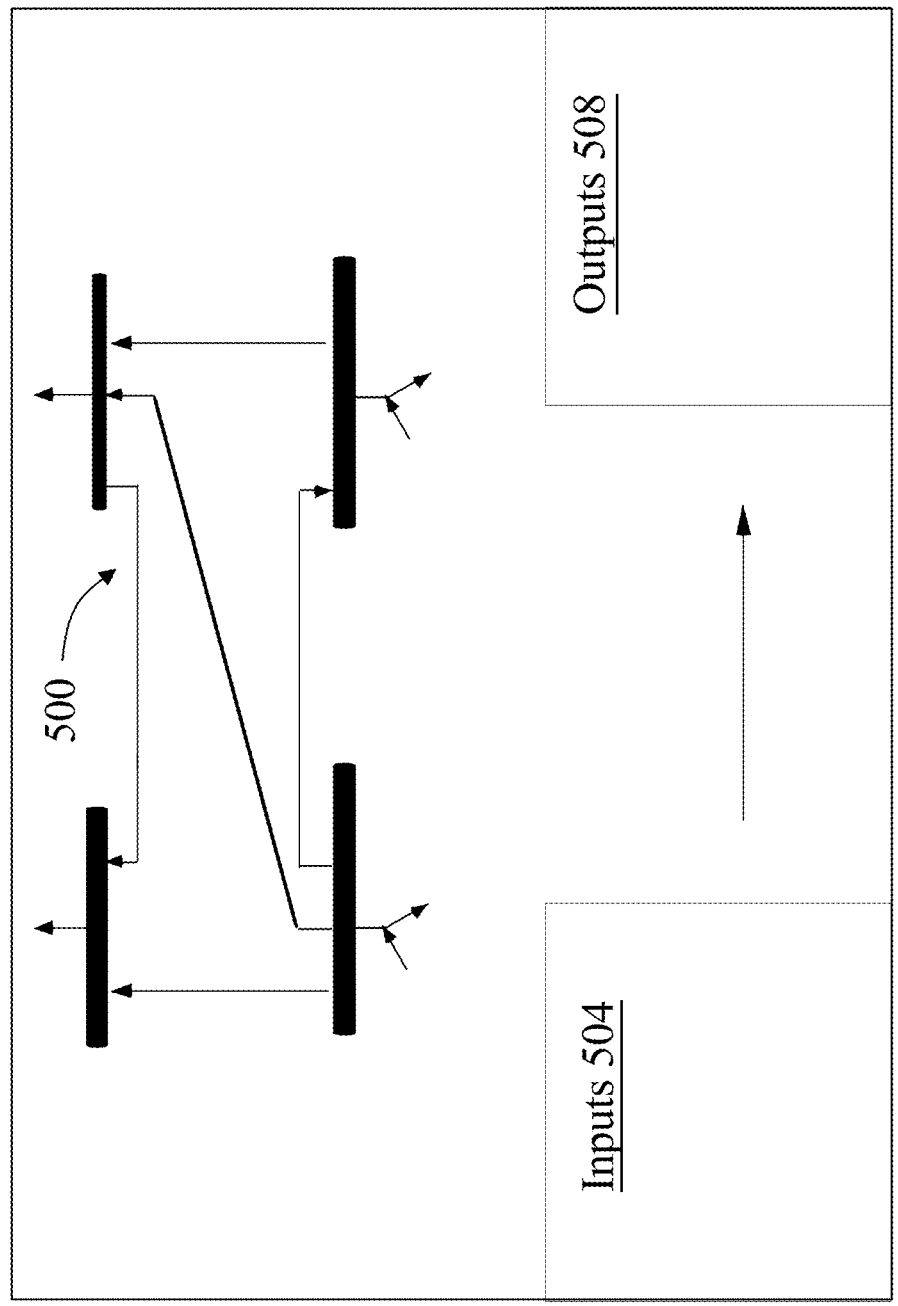
FIG. 5 is an illustrative graphical representation of an exemplary embodiment of an optimized carbon flow.

Referring to FIG. 5, an illustrative graphical representation 500 of an exemplary embodiment of an optimized carbon flow is presented. In this illustrative example, the optimized carbon flow is given a set of inputs 504, where the graphical representation shows the optimized path of power generation that reduces carbon footprint while retaining the optimizations of OPF model and the predicted outputs 508. In some embodiments, processor 104 may be configured to generated a graphical representation of optimized carbon flow.

Figure 6:
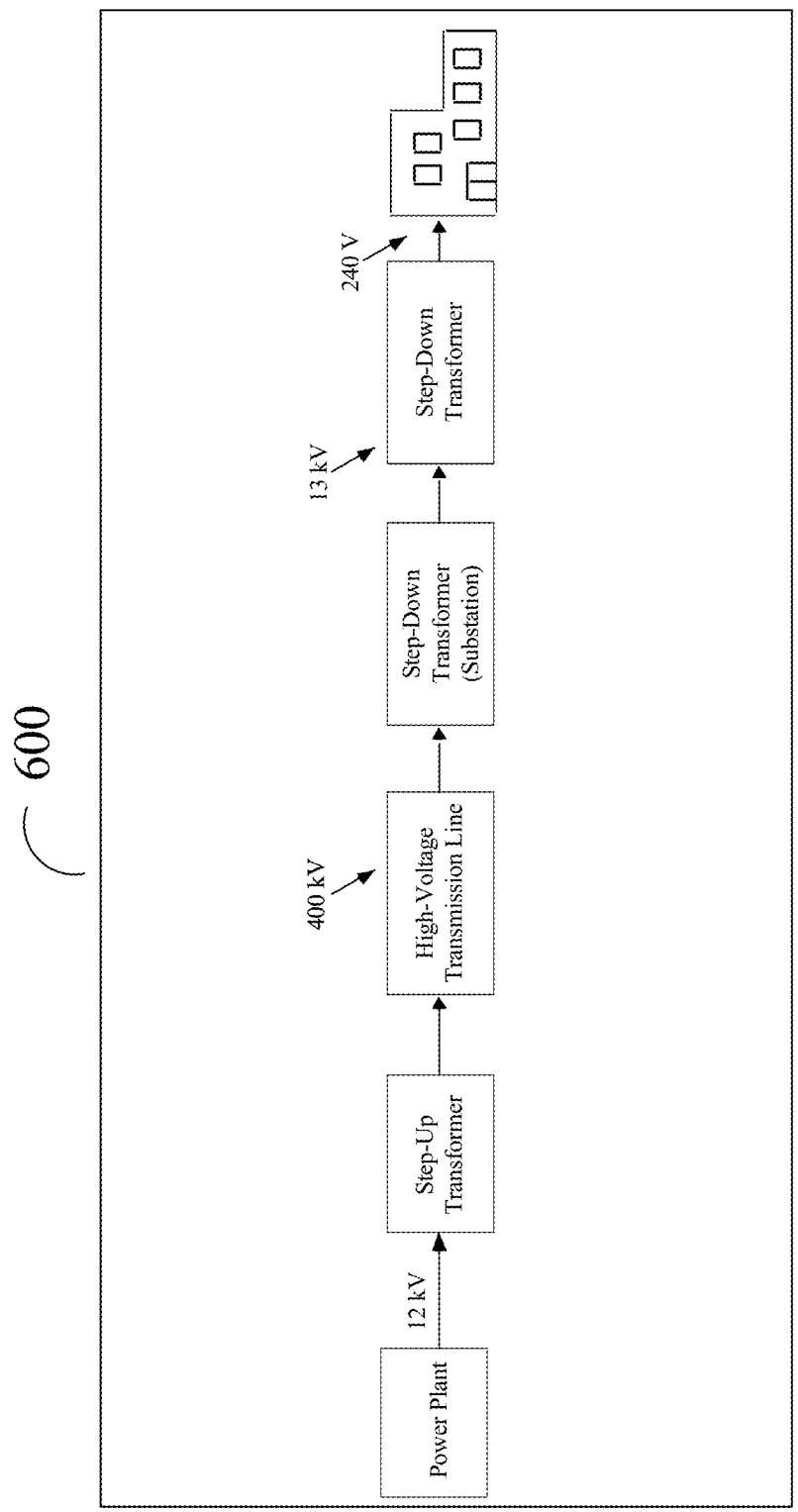
FIG. 6 is an illustrative diagram of an electricity flow in a power grid.

Referring now to FIG. 6, an exemplary embodiment of an eGRID 600 is illustrated. In this exemplary embodiment, the limitations of current eGRIDs are shown, where only transmission level power generators are account for.

Figure 7:
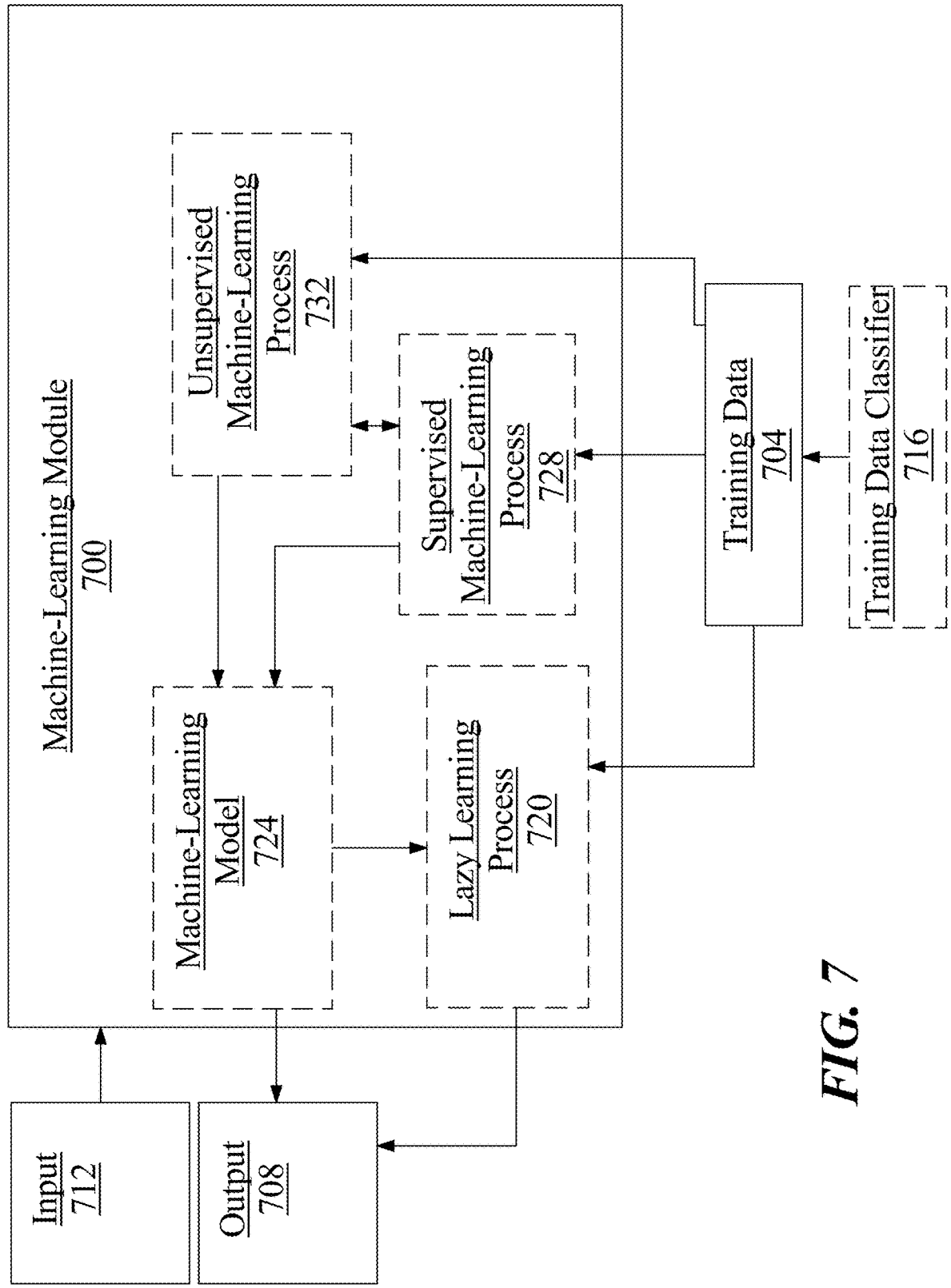
FIG. 7 is a block diagram of an exemplary embodiment of a machine learning processes.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, in some embodiments, data from power quantities datastore may be used to make a plurality of training entries, to be used as training data. "Training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example power datum may be used as inputs and optimized grid parameters is an output.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to carbon generating entities.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include power datum as described above as inputs, optimized carbon allocation as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 8:
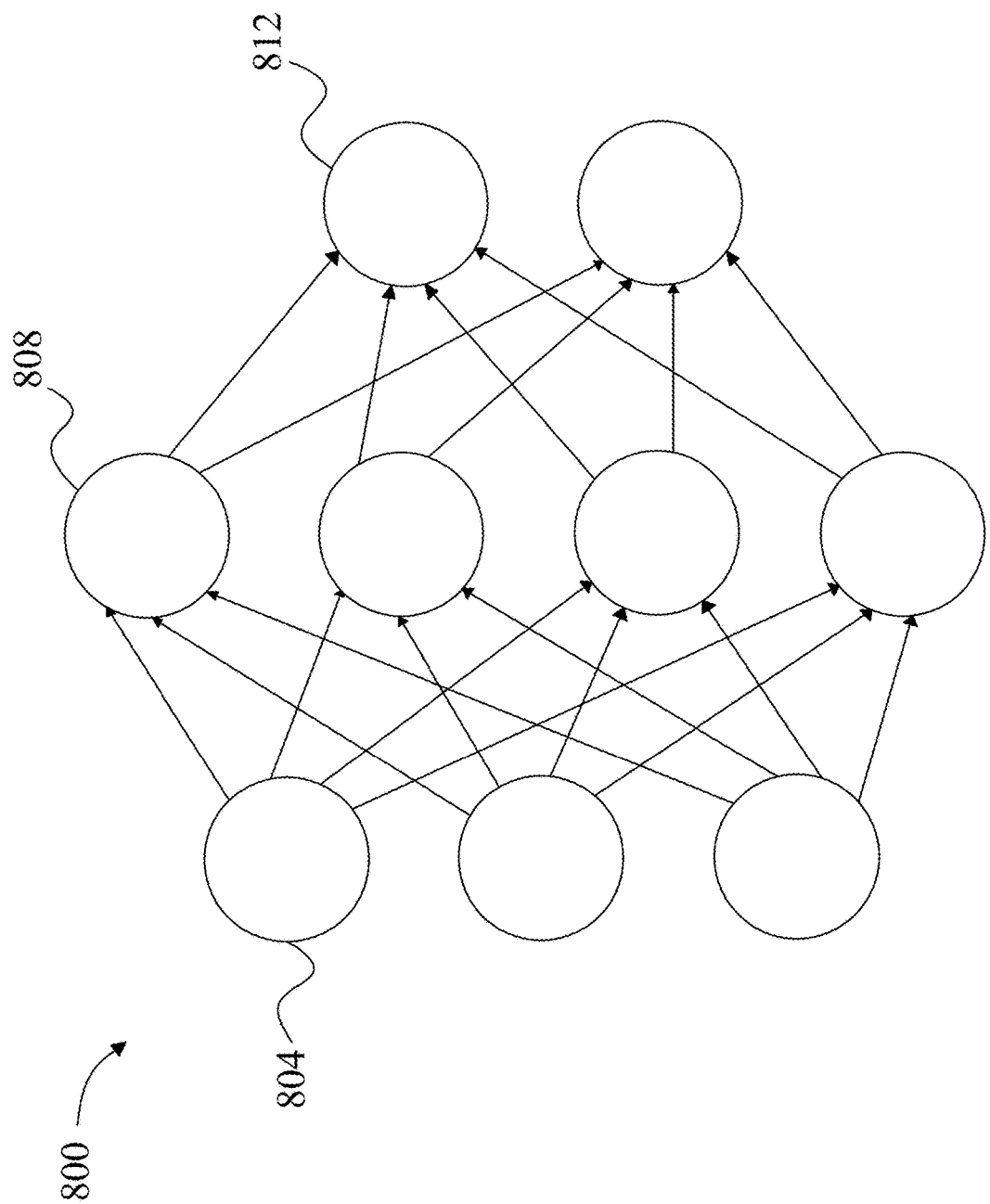
FIG. 8 is a diagram of an exemplary embodiment of a neural network.

Referring now to FIG. 8, an exemplary embodiment of neural network 800 is illustrated. A neural network 800 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 804, one or more intermediate layers 808, and an output layer of nodes 812. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 9:
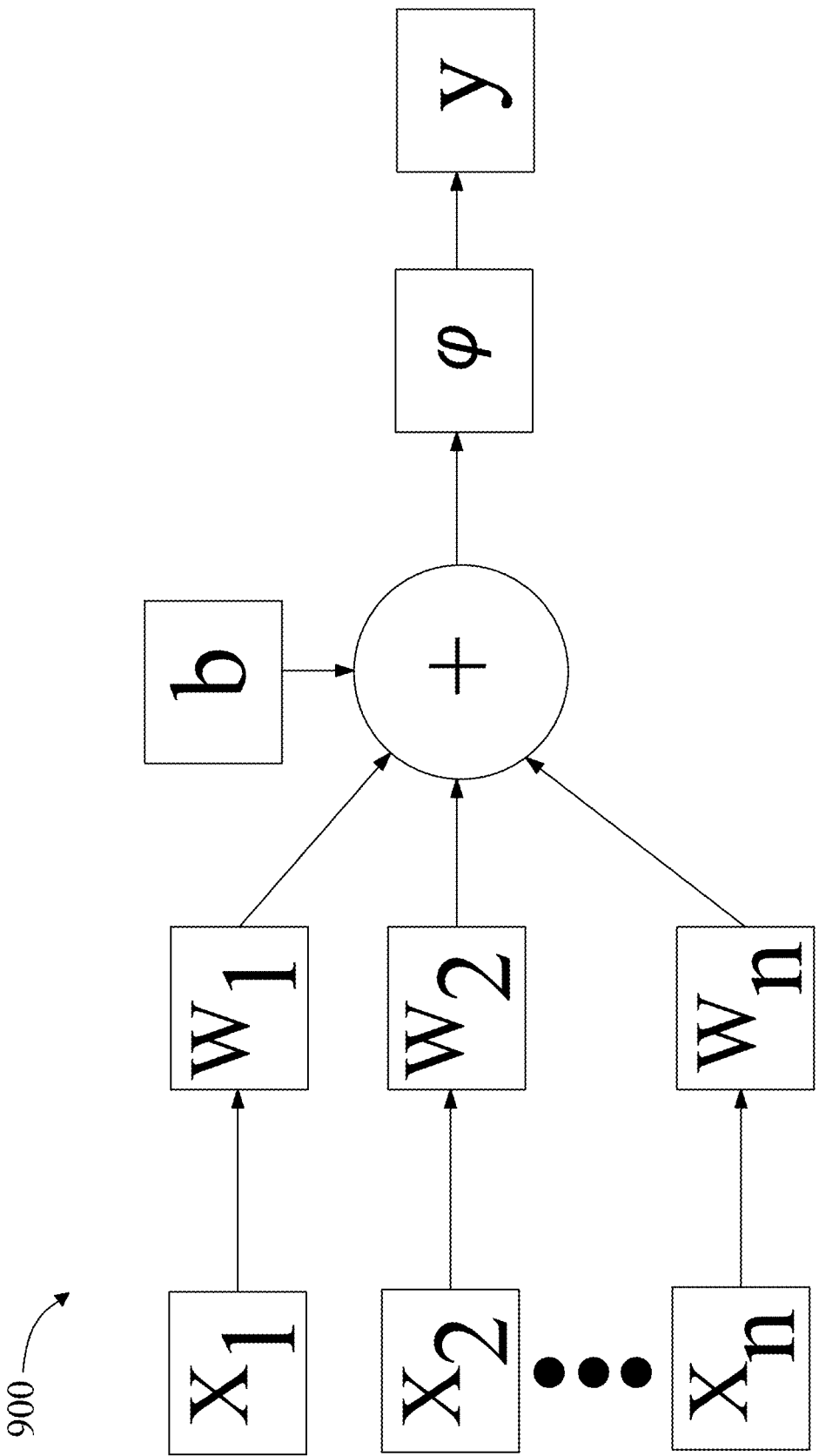
FIG. 9 is a diagram of an illustrative embodiment of a node of a neural network.

Referring now to FIG. 9, an exemplary embodiment of a node 900 of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function co, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
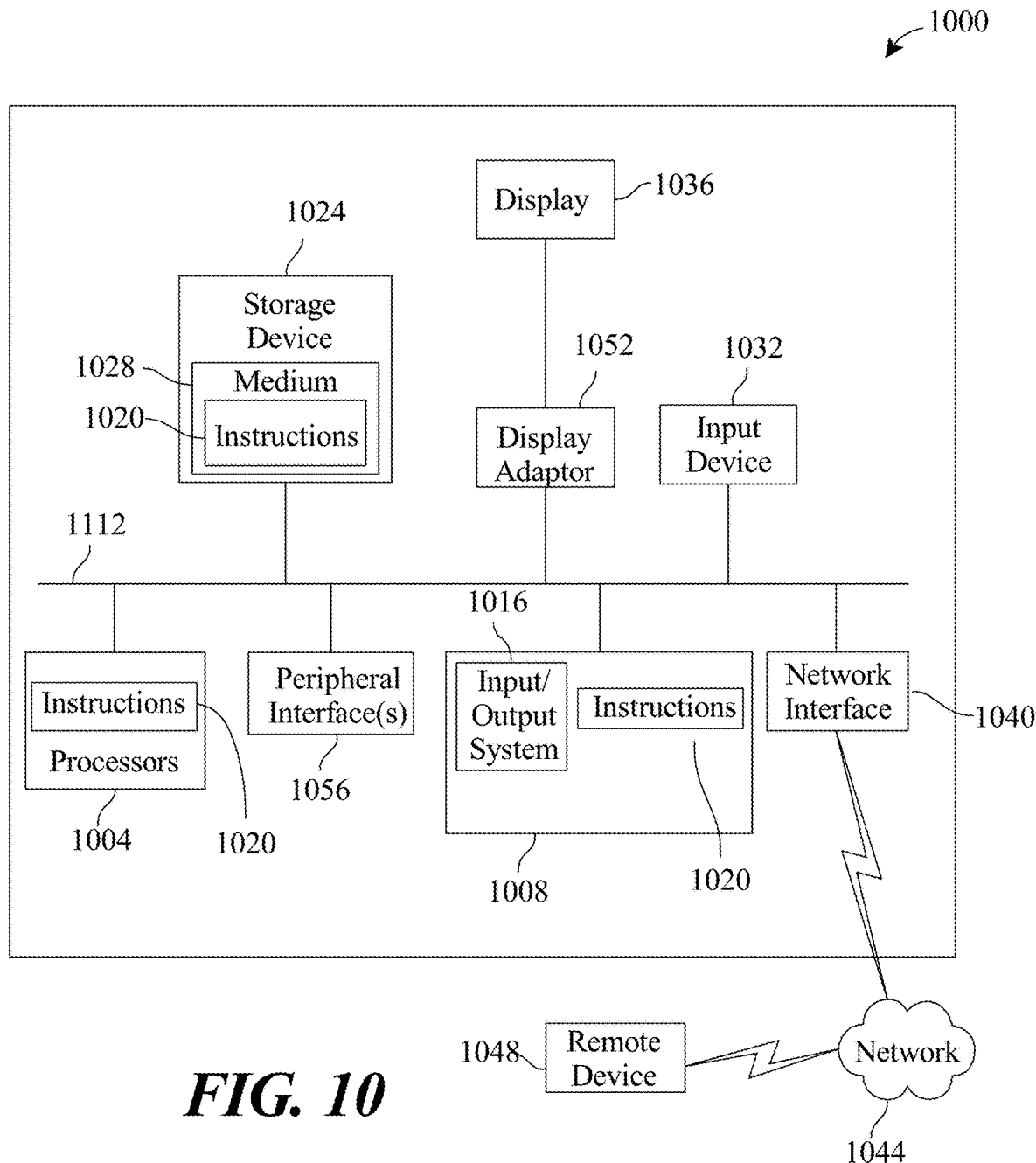
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media)

instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for optimizing carbon emissions in a power grid network, the apparatus comprises:
    at least a processor; and
    a memory communicatively connected to the at least a processor, the memory containing instructions configuring the at least a processor to:
    receive a plurality of power flow data from at least a grid monitoring device communicatively connected to a grid network including a plurality of nodes, wherein the plurality of power flow data comprises at least a generation datum, at least a power consumption datum;
    generate a power flow allocation for at least a first node and a second node in the network as a function of the at least a power consumption datum and the at least a generation datum;

determine, for at least a node of the plurality of nodes, a carbon flow as a function of the power flow allocation and a first set of stored relational rules;

generate an objective function of carbon flow and a second set of stored relational rules;

minimize the objective function of carbon flow as a function of the carbon optimization model and an optimization algorithm;

generate a grid modification as a function of the minimization; and modify a grid parameter of the grid network as a function of the grid modification;

generate an energy storage power model as a function of the at least a power consumption datum;

determine an energy storage carbon intensity as a function of the energy storage power model; and generate an energy storage carbon emission model as a function of the energy storage carbon intensity.

2. The apparatus of claim 1, wherein the processor is configured to determine the power flow allocation as a function of a power flow machine learning model.

3. The apparatus of claim 1, wherein the processor is further configured to determine the optimized grid parameters as a function of the energy storage carbon emission model.

4. The apparatus of claim 1, wherein the processor is further configured to generate a projected carbon flow as a function of a carbon optimization model.

5. The apparatus of claim 1, wherein the processor is further configured to reduce power output from at least a power generator as a function of the modified grid parameter.

6. The apparatus of claim 1, wherein modifying the grid parameter further comprises using a Volt/Var control.

7. The apparatus of claim 1, wherein the processor is further configured to generate a graphical representation of the carbon flow.

8. A method for optimizing carbon emissions in a power grid, the method comprising:

receiving, by at least a processor, a plurality of power flow data from at least a grid monitoring device communicatively connected to a grid network including a plurality of nodes, wherein the plurality of power flow data comprises at least a generation datum and at least a power consumption datum;

generating, by the at least a processor, a power flow allocation for at least a first node and a second node in the network as a function of the at least a power consumption datum and the at least a generation datum;

determining, by the at least a processor, a carbon flow as a function of the power flow allocation and a first set of stored relational rules for at least a node of the plurality of nodes;

generating, by the at least a processor, an objective function of a carbon flow and a second set of stored relational rules;

minimizing, by the at least a processor, the objective function of a carbon flow as a function of the optimization algorithm;

generating, by the at least a processor, a grid modification as a function of the minimization; and modifying, by the at least a processor, a grid parameter of the grid network as a function of the grid modification;

generating, by the at least a processor, an energy storage power model as a function of the at least a power consumption datum;

determining, by the at least a processor, an energy storage carbon intensity as a function of the energy storage power model; and generating, by the at least a processor, an energy storage carbon emission model as a function of the energy storage carbon intensity.

9. The method of claim 8, wherein the method further comprises determining the power flow allocation as a function of a power flow machine learning model.

10. The method of claim 8, wherein the method further comprises determining the optimized grid parameters as a function of the energy storage carbon emission model.

11. The method of claim 8, wherein the method further comprises generating a projected carbon flow as a function of a carbon optimization model.

12. The method of claim 8, wherein the method further comprises reducing power output from at least a power generator as a function of the modified grid parameter.

13. The method of claim 8, wherein modifying the grid parameter further comprises using a Volt/Var control.

14. The method of claim 8, wherein the method further comprises generating, by the at least a processor, a graphical representation of the carbon flow.

* * * * *